(12) United States Patent
Muceus

(10) Patent No.: US 12,486,017 B2
(45) Date of Patent: Dec. 2, 2025

(54) ADDITIVE MANUFACTURED INTEGRAL FASTENING SYSTEM FOR MISSION ADAPTABLE UNMANNED AERIAL VEHICLES

(71) Applicant: Firestorm Labs, Inc., San Diego, CA (US)

(72) Inventor: Ian Muceus, San Diego, CA (US)

(73) Assignee: Firestorm Labs, Inc., San Diego, CA (US)

( * ) Notice: Subject to any disclaimer, the term of this patent is extended or adjusted under 35 U.S.C. 154(b) by 0 days.

(21) Appl. No.: 19/079,138

(22) Filed: Mar. 13, 2025

(65) Prior Publication Data
US 2025/0289561 A1    Sep. 18, 2025

Related U.S. Application Data

(60) Provisional application No. 63/564,964, filed on Mar. 13, 2024.

(51) Int. Cl.
| | | |
|---|---|---|
| *B64C 7/00* | (2006.01) | |
| *B64C 1/26* | (2006.01) | |
| *B64U 20/40* | (2023.01) | |

(52) U.S. Cl.
CPC .................. *B64C 7/00* (2013.01); *B64C 1/26* (2013.01); *B64U 20/40* (2023.01); *B64C 2211/00* (2013.01)

(58) Field of Classification Search
CPC .... B64C 7/00; B64C 1/26; B64C 3/24; B64C 2211/00; B64U 20/40
See application file for complete search history.

(56) References Cited

U.S. PATENT DOCUMENTS

| | | | |
|---|---|---|---|
| 2,019,652 | A | 11/1935 | Brookley |
| 3,218,005 | A | 11/1965 | Alvarez Calderon |

(Continued)

FOREIGN PATENT DOCUMENTS

| | | |
|---|---|---|
| CN | 102923296 A | 2/2013 |
| CN | 105771269 A | 7/2016 |

(Continued)

OTHER PUBLICATIONS

USAF Invests $100M in Firestorm Labs for 3D Printed UAS. by Anyer Tenorio Lara. dated Feb. 12, 2025. found online [Apr. 21, 2025] https:113dprintingindustry.com/news/usaf-invests-100m-in-firestorm-labs-for-3d-printed-uas-236259/.

(Continued)

*Primary Examiner* — Rodney A Bonnette
(74) *Attorney, Agent, or Firm* — Perkins Coie LLP

(57) ABSTRACT

Disclosed are specialized airframe structures for mission-adaptable unmanned aerial vehicles (UAVs) that are fabricated by rapid, low-cost additive manufacturing techniques. In some embodiments, an integral fastening system for a mission-adaptable aerial vehicle includes a first airframe section, a second airframe section, and a bayonet mount system that comprises one or more passageways produced on a first end region of the first airframe section to include a first channel and second channel, and one or more protrusions produced on a second end region of the second airframe section, such that, when the first and second airframe sections being assembled, the one or more protrusions are first aligned with an entry region of the first channel to be translated and then aligned with the second channel of the one or more passageways to be rotated to securely connect the first and second airframe sections together.

20 Claims, 8 Drawing Sheets

(56) References Cited

U.S. PATENT DOCUMENTS

| | | |
|---|---|---|
| 4,494,940 A | 1/1985 | Gretz |
| D278,728 S | 5/1985 | Ninomiya |
| D280,007 S | 8/1985 | Benneche et al. |
| 4,786,008 A | 11/1988 | Corbett |
| 5,322,243 A | 6/1994 | Stoy |
| 5,395,073 A | 3/1995 | Rutan et al. |
| 6,065,720 A | 5/2000 | Ash |
| 7,059,566 B2 | 6/2006 | Byers et al. |
| 7,165,772 B1 * | 1/2007 | Camacho ............... F16J 9/14 |
| | | 277/496 |
| 7,219,861 B1 | 5/2007 | Barr |
| D596,267 S | 7/2009 | Colgren et al. |
| D628,528 S | 12/2010 | Cabezas Carrasco |
| 8,068,949 B2 | 11/2011 | Duggan |
| 8,068,950 B2 | 11/2011 | Duggan |
| 8,082,074 B2 | 12/2011 | Duggan |
| 8,103,398 B2 | 1/2012 | Duggan |
| 8,355,834 B2 | 1/2013 | Duggan |
| 8,380,425 B2 | 2/2013 | Duggan |
| 8,700,306 B2 | 4/2014 | Duggan |
| D706,678 S | 6/2014 | Earon |
| 8,768,555 B2 | 7/2014 | Duggan |
| 8,882,560 B2 | 11/2014 | Sofman |
| D725,548 S | 3/2015 | Herald et al. |
| D729,694 S | 5/2015 | Earon |
| 9,108,729 B2 | 8/2015 | Duggan |
| 9,254,363 B2 | 2/2016 | Levien |
| 9,308,462 B1 | 4/2016 | Huang et al. |
| 9,555,873 B1 | 1/2017 | Alley et al. |
| 9,713,675 B2 | 7/2017 | Levien |
| 10,137,982 B1 | 11/2018 | Dormiani et al. |
| 10,767,624 B2 | 9/2020 | Monreal Lesmes et al. |
| 11,027,584 B1 | 6/2021 | Kiceniuk, Jr. |
| D931,757 S | 9/2021 | Liu |
| 11,187,203 B2 | 11/2021 | Badger |
| 11,358,700 B1 | 6/2022 | Poe |
| 11,450,233 B2 | 9/2022 | Becker |
| 11,521,512 B2 | 12/2022 | Marquinez Torrecilla et al. |
| 11,590,854 B1 * | 2/2023 | Wiegman ............... B60L 53/16 |
| 11,597,490 B1 * | 3/2023 | Gundlach ............... B64F 5/00 |
| 11,721,231 B2 | 8/2023 | Becker |
| 11,981,460 B2 * | 5/2024 | Muceus ............... B64U 20/75 |
| D1,030,555 S | 6/2024 | He et al. |
| D1,031,516 S | 6/2024 | He et al. |
| D1,035,547 S | 7/2024 | He et al. |
| 12,202,634 B1 | 1/2025 | England |
| 12,236,494 B1 | 2/2025 | Melgar |
| 12,240,634 B1 | 3/2025 | Muceus |
| 2004/0248496 A1 | 12/2004 | Harvey |
| 2008/0149758 A1 | 6/2008 | Colgren et al. |
| 2009/0026321 A1 | 1/2009 | Sarh |
| 2009/0166477 A1 | 7/2009 | Bousfield |
| 2010/0159434 A1 | 6/2010 | Lampotang |
| 2010/0178966 A1 | 7/2010 | Seydoux |
| 2011/0036939 A1 | 2/2011 | Easter |
| 2011/0130913 A1 | 6/2011 | Duggan |
| 2011/0221692 A1 | 9/2011 | Seydoux |
| 2012/0123628 A1 | 5/2012 | Duggan |
| 2013/0345920 A1 | 12/2013 | Duggan |
| 2014/0025229 A1 | 1/2014 | Levien |
| 2014/0234116 A1 | 8/2014 | Cussac et al. |
| 2014/0324253 A1 | 10/2014 | Duggan |
| 2015/0003991 A1 | 1/2015 | Bagepalli et al. |
| 2015/0292477 A1 | 10/2015 | Kratmann et al. |
| 2016/0121992 A1 | 5/2016 | Saroka et al. |
| 2016/0129984 A1 | 5/2016 | Tryaki et al. |
| 2016/0332722 A1 * | 11/2016 | Harding ............... B64C 23/072 |
| 2017/0008611 A1 | 1/2017 | Murta et al. |
| 2017/0066135 A1 | 3/2017 | Cohen |
| 2017/0152014 A1 | 6/2017 | Gould |
| 2017/0185081 A1 | 6/2017 | Steele |
| 2017/0253316 A1 | 9/2017 | Benthien et al. |
| 2017/0349281 A1 | 12/2017 | Quinlan et al. |
| 2018/0067476 A1 | 3/2018 | Engelbart et al. |
| 2018/0086458 A1 * | 3/2018 | Sartorius ............... B64U 50/19 |
| 2018/0104863 A1 | 4/2018 | Cottrell et al. |
| 2018/0162540 A1 | 6/2018 | Iliopoulos |
| 2018/0273158 A1 | 9/2018 | Courtin |
| 2018/0290725 A1 | 10/2018 | Koessler et al. |
| 2018/0297698 A1 | 10/2018 | Dhall |
| 2018/0312252 A1 | 11/2018 | Yates |
| 2018/0334248 A1 | 11/2018 | Neiser |
| 2018/0355842 A1 | 12/2018 | Badger |
| 2019/0051051 A1 | 2/2019 | Kaufman |
| 2019/0077098 A1 | 3/2019 | Riley et al. |
| 2019/0077496 A1 | 3/2019 | Livieratos et al. |
| 2019/0106192 A1 | 4/2019 | Woodworth et al. |
| 2019/0106195 A1 | 4/2019 | Wilkerson |
| 2019/0135403 A1 | 5/2019 | Perry et al. |
| 2019/0143596 A1 | 5/2019 | Fiechter et al. |
| 2019/0193829 A1 | 6/2019 | Schlueter |
| 2019/0224909 A1 | 7/2019 | Riha et al. |
| 2019/0255777 A1 | 8/2019 | Fiechter et al. |
| 2019/0322032 A1 | 10/2019 | Riha et al. |
| 2019/0322047 A1 | 10/2019 | Riha et al. |
| 2019/0374868 A1 | 12/2019 | Russell |
| 2019/0381530 A1 | 12/2019 | Beaudoin |
| 2019/0389555 A1 | 12/2019 | Guering |
| 2020/0032665 A1 | 1/2020 | Propheter-Hinckley |
| 2020/0047867 A1 | 2/2020 | Griess et al. |
| 2020/0180760 A1 | 6/2020 | Richardson |
| 2020/0188732 A1 | 6/2020 | Kruger |
| 2020/0216196 A1 | 7/2020 | Sohmshetty |
| 2020/0247561 A1 | 8/2020 | Rivera |
| 2020/0310408 A1 | 10/2020 | Carper |
| 2020/0407039 A1 | 12/2020 | Sanders |
| 2021/0031912 A1 | 2/2021 | Yates |
| 2021/0046694 A1 | 2/2021 | Rowe et al. |
| 2021/0070419 A1 | 3/2021 | Decker et al. |
| 2021/0082304 A1 | 3/2021 | Daley |
| 2021/0174695 A1 | 6/2021 | Clark |
| 2021/0197965 A1 * | 7/2021 | Kunz ............... B64U 30/14 |
| 2021/0222809 A1 | 7/2021 | Chung |
| 2021/0232873 A1 | 7/2021 | Kothari |
| 2021/0256875 A1 | 8/2021 | Sakhnini |
| 2021/0331789 A1 | 10/2021 | Wardlaw |
| 2021/0347462 A1 | 11/2021 | Haack et al. |
| 2021/0372366 A1 | 12/2021 | Merzhaeuser et al. |
| 2021/0403143 A1 | 12/2021 | Alley et al. |
| 2022/0017204 A1 | 1/2022 | Helou |
| 2022/0111956 A1 | 4/2022 | Jordan |
| 2022/0152758 A1 | 5/2022 | Jones |
| 2022/0153452 A1 | 5/2022 | Smith et al. |
| 2023/0166828 A1 * | 6/2023 | Makarchuk ............ B64U 10/25 |
| | | 244/13 |
| 2023/0192267 A1 | 6/2023 | Gundlach et al. |
| 2023/0339596 A1 | 10/2023 | Baxter et al. |
| 2024/0085929 A1 | 3/2024 | He et al. |
| 2024/0092510 A1 | 3/2024 | Muceus |
| 2024/0185736 A1 | 6/2024 | Prodzenko |
| 2024/0294279 A1 | 9/2024 | Muceus |
| 2024/0339046 A1 | 10/2024 | Paull |
| 2024/0371290 A1 | 11/2024 | Kane |
| 2025/0021101 A1 | 1/2025 | Koch |
| 2025/0026506 A1 | 1/2025 | Robbins-Rothman |
| 2025/0033809 A1 | 1/2025 | Jiang |
| 2025/0058904 A1 | 2/2025 | Muceus |
| 2025/0108943 A1 | 4/2025 | Sekiguchi |
| 2025/0153871 A1 | 5/2025 | Liu |
| 2025/0155785 A1 | 5/2025 | Tian |

FOREIGN PATENT DOCUMENTS

| | | |
|---|---|---|
| CN | 106671402 A | 5/2017 |
| CN | 112061372 A | 12/2020 |
| CN | 112158323 A | 1/2021 |
| EP | 3525259 A1 | 8/2019 |
| FR | 3025491 A1 | 9/2014 |
| FR | 3109369 A1 | 4/2020 |
| IN | 201941005768 | 2/2019 |
| WO | 2017207874 A1 | 12/2017 |
| WO | 2019125159 A1 | 6/2019 |

(56) References Cited

FOREIGN PATENT DOCUMENTS

| WO | 2019212553 A1 | 11/2019 |
|---|---|---|
| WO | 2020264115 A1 | 12/2020 |
| WO | 2023220447 A2 | 11/2023 |

OTHER PUBLICATIONS

International Application No. PCT/US2023/022151 International Search Report and Written Opinion mailed Dec. 27, 2023, pp. 1-17.
Eric Tegler, "UAS Startup Firestorm's Ambition To Crank Out Combat Drones Fast, Cheap And En Masse Is A 4 Lesson For DoD", article, Apr. 27, 2023, 6 pages, US.
Scott Sevcik, "Where's the real value in additive?—An AM Perspective (Part 2)", LinkedIn Article, Dec. 5, 2022, 5 pages, US.
Troy Mcmillan, "How to build Exlipson Model V—RC 3D Printed Airplane" YouTube Video, Feb. 25, 2021, 7 pages.
Robert M. Taylor, Nicholas Lira, Gavin Sabine, Joakim Lea, Craig Conklin, Bijan Niakan, and Sangram Advirkar, "Design Optimization, Fabrication and Testing of a 3D Printed Aircraft Structure Using Fused 9 Deposition Modeling", AIAA SciTech Forum, Jan. 10, 2020, 16 pages, American Institute of Aeronautics and Astronautics, Inc., Arlington, TX, US.
Aaron Pearson "World's first jet-powered, 3D printed UAV tops 150 mph with lightweight Stratasys materials" blog Mar. 24, 2020, 3 pages, Stratasys.com.
Luca De Vivo, Danny Tran, and Falko Kuester, "Towards Design of a 3D Printable Prandtl Box-Wing Unmanned Aerial Vehicle", 2018, 17 pages, CISA3 DroneLab Jacobs School of Engineering.
Kelsey Muller, "Flying from Protoypring to Mainstream: 3D Printed Aircrafts Top Out at Speeds of 150mph", Technology and Operation Management MBA Student Perspectives Assignments, Nov. 12, 2018, 2 pages.
Henry Tucher, "How U.S. Marine Rhet McNeal Designed a 3D Printable Drone to Cost 200X Less at Autodesk's Pier 9" Autodesk News Article, Aug. 22, 2017, 5 pages.
Zhuo Wei Wong, Yunus Govdeli, and Erdal Kayacan, "Additive Manufacturing of Unmanned Aerial Vehicles: Current Status, Recent Advances, and Future Perspectives", 2016, 1 pages, Research Publishing, Singapore.
Daniel O'Connor, "Game of Drones", TCT Magazine Feb. 29, 2016, 8 pages.
G.D. Goh, S. Agarwala, G.L. Goh, V. Dikshit, S.L. Sing, and W.Y. Yeong, "Additive manufacturing in unmanned aerial vehicles (UAVs): Challenges and potential", Aerospace Science and Technology Forum, Aug. 25, 2016, 12 pages.
Robert P. Dahlgren, Juan J. Alonso, and Matthew M. Fladeland, "Progress on Modular Unmanned Aircraft Technology", ASPRS 3rd UAS Symposium, Sep. 12-14, 2016, 25 pages.
Chris Banfield, James Kidd, and Jamey Jacob, "Design and Development of a 3D Printed UAV", Aerospace Science and Technology Forum, Jan. 4-8, 2016, 79 pages.
Newco, "Local Motors: Driving Innovation with Micro-Manufacturing", Medium Magazine Article, Oct. 12, 2016, 21 pages.
Aurora Flight Sciences, "Aurora Successfully Flies Subscale X-Plane Aircraft " YouTube Video, Apr. 18, 2016, 1 page.
University of Virginia, "The Razor: UVA's 3D-printed U.A.V.", YouTube Video, Aug. 29, 2014, 1 page.
Press, "Aurora Flight Sciences 3D printed wing", sUAS News the business of drones Article, Nov. 9, 2015, 4 pages.
Pedro Santos, Joaquim Sousa, and Pedro Gamboa, "Variable span wing development for improved flight performance" Journal of Intelligent Material Systems and Structures, 2015, 8 pages.
S. Palanivel, H. Sidhar, and R.S. Mishra, "Friction Stir Additive Manufacturing: Route to High Structural Performance", Article in JOM: the journal of the Minerals, Metals & Materials Society Jan. 13, 2015, 7 pages, vol. 67, No. 3.
Michael Molitch-Hou, "Feasibility of Hovering Aircraft Demonstrated with 3D Printing", web article, May 4, 2016, 4 pages.
BUSINESSWIRE A Berkshire Hathhaway Company, "Aurora Flight Sciences and Stratasys Deliver World's First Jet-Powered, 3D Printed UAV in Record Time", Nov. 9, 2015, 3 pages.
Carl Muldal, Edward Kolb, Graham Robertson, Aaron Parkinson, Osvaldo M. Querin, Robert W. Hewson and Vassili V. Toropov, "The use of MDO and Advanced Manufacturing to Demonstrate Rapid, Agile Construction of a Mission Optimized UAV", Apr. 2013, 22 pages, American Institute of Aeronautics and Astronautics.
Steven Easter, Jonathan Turman, David Sheffler, Michael Balazs, and Jonathan Rotner, "Using Advanced Manufacturing to Produce Unmanned Aerial Vehicles: A Feasibility Study'" May 22, 2013, 17 pages.
N.A. Ahmed and J.R. Page "Manufacture of an Unmanned Aerial Vehicle (UAV) for Advanced Project Design using 3D Printing technology", 2013, 11 pages, vols. 397-400, pp. 970-980, Applied Mechanics and Materials.
UVAtoday, "Student Engineers Design, Build, Fly 'Printed' Airplane", Web Article, Oct. 5, 2012, pages.
AMRC Design and Prototyping Group, "Rapid Manufactured Fixed Wing Powered UAV", Case Study, UK, retrieved online Oct. 10, 2025, 11 pages.
AMRC Design and Prototyping Group, "FDM Printed Fixed Wing UAV", Case Study, UK, 2014, 7 pages.
North, et al., "Design and Fabrication of the Langley Aerodrome No. 8 Distributed Electric Propulsion VTOL Testbed", Journal, US, Jan. 2021, 19 pages.
Ferraro, et al., "Design and flight test of a civil unmanned aerial vehicle for maritime patrol: the use of 3D-printed structural components", Jan. 2014, 14 pages.
Joe Hiemenz, "Additive Manufacturing Trends in Aerospace", Stratasys Article, 2013, 11 pages.
International Application No. PCT/US2025/019771 International Search Report and Written Opinion mailed Jul. 16, 2025, 16 pages.

\* cited by examiner

ADDITIVE MANUFACTURED INTEGRAL FASTENING SYSTEM FOR MISSION ADAPTABLE UNMANNED AERIAL VEHICLES

CROSS-REFERENCE TO RELATED APPLICATIONS

This patent document claims priority to and the benefits of U.S. Provisional Patent Application No. 63/564,964, filed on Mar. 13, 2024. The entire contents of the afore-mentioned patent application are incorporated by reference as part of the disclosure of this application.

TECHNICAL FIELD

This patent document relates to aerial vehicles, and more particularly to an integral fastening system for additively manufactured airframe components for mission-adaptable aerial vehicles.

BACKGROUND

An aerial vehicle is a system of multiple subsystems launched into the air under its own power or by way of interaction with a launching apparatus. The aerial vehicle is generally produced to carry a specific payload or payloads, including inanimate or animate cargo or human passengers, over a given range or for a predetermined amount of time. They may be directly controlled by a pilot, remotely operated, or autonomously operated. The thrust for launch and during flight of an aerial vehicle can be provided from a range of power sources (powerplants), including but not limited to: rockets, electrically-driven propellers, and turbojet or turbofan engines. The type of aerial vehicle's powerplant determines which type of fuel or energy storage mechanism is needed to be carried onboard in order to power the powerplant and thereby provide the thrust for the aerial vehicle.

Aerial vehicles may take on a wide range of shapes, sizes, and form factors dependent upon their mission requirements. Typically, an aerial vehicle designer takes into account available components and materials, mission requirements, environmental factors, and other constraints, and then crafts the end product around all of these variables. The result is that many different designs—whether subtle or substantial—could potentially satisfy the same mission set requirements; though, there is often a "best" design.

Presently, there are several problems associated with existing aerial vehicles, typically rooted in their design. For example, one problem with past and current aerial vehicle designs is that requirements, both mission-related and payload-related, often change rapidly. For instance, a requirement for the endurance or loitering time of an intelligence, surveillance, and reconnaissance (ISR) aerial vehicle could change dramatically if the theater changed from a mostly terrestrial area with nearby targets to a highly maritime theater with distant targets. Additionally, the aerial vehicle design process can be a very lengthy, where in some cases the design process takes multiple years or even decades because of the strict design constraints on a single aerial vehicle to arrive at the "best" design. Even further, technological advancement in certain areas of aerial vehicle components, subsystems, software, energy storage, and the like can also exceed that of the development of aerial vehicles. An example of this includes an electrically-powered aerial vehicle that is designed around a specific type of battery with a given energy density, which could later see battery technology advance to the point where a new battery's energy density makes the aerial vehicle's design no longer performant or competitive against other designs. With an expensive development process, a large outlay of human resources to accomplish successful products, lengthy development and testing timelines, rapidly-changing mission requirements, and technological advancement arcs (oftentimes disrupting development and production processes), it is easy to see that problems plague the status quo in aerial vehicle development. While past and current design, development, and production methods had their time and place, there is a true need for a more flexible and lower-cost solution for the end-user and customer.

SUMMARY

Disclosed are specialized fastening systems integrated with airframe components for a mission-adaptable unmanned aerial vehicle (UAV) fabricated by rapid, low-cost additive manufacturing techniques that allow for tool-less assembly of the airframe components when building the UAV.

In some aspects, an integral fastening system for a mission-adaptable aerial vehicle in accordance with the present technology includes a bayonet mount system that includes a passageway on a first outer region (e.g., exterior-facing side of an indented ledge) of a first airframe section, and a protrusion (e.g., lug) that is produced on a side (e.g., an interior-facing side or exterior facing side) of a second outer region of a second airframe section. The passageway includes a first channel that is (i) perpendicular with or (ii) at an angle (e.g., acute angle) to the perpendicular of a circumference of the first outer region (e.g., on the indented ledge) of the first airframe section, and a second channel connected with the first channel and is (i) radially parallel with the circumference of the first outer region or (ii) at an angle between the perpendicular and the circumference less than 90 degrees. The protrusion is configured to align with and be translated into the first channel and subsequently be rotated within the second channel to securely connect the first and second airframe sections together. In some embodiments, the bayonet mount system includes a locking assembly that includes a deflection tab disposed at the first outer region of the first airframe section and a corresponding slot (e.g., notch or through-hole) in the second outer region of the second airframe section, where the deflection tab is configured to deflect radially (in a direction toward the interior of the airframe) when depressed by a contact surface of the second outer region of the second airframe section as the protrusion is translated and rotated within the first and second channels, respectively, of the passageway of the first outer region of the first airframe section, such that when the deflection tab is aligned with the corresponding slot, the deflection tab returns to its initial state that projects into the slot, thereby locking the first and second airframe sections together. In some embodiments, the bayonet mount system includes a plurality of passageways on the first airframe section and a plurality of corresponding protrusions on the second airframe section. In some embodiments, the bayonet mount system includes a plurality of deflection tabs and a plurality of corresponding slots. In some embodiments, the deflection tab(s) is/are positioned on the first airframe section and the slot(s) is/are positioned on the second airframe section; whereas, in some embodiments, the deflection tab(s) is/are positioned on the second airframe section and the slot(s) is/are positioned on the first airframe section.

In some embodiments, a mission-adaptable aerial vehicle includes a fuselage assembly comprising one or more fuselage sections; a wing assembly reversibly attachable to the fuselage assembly, where the wing assembly comprises at least one wing section; a nose cone assembly reversibly attachable to the fuselage assembly, where the nose cone assembly comprises at least one nose cone section; and a tail assembly reversibly attachable to the fuselage assembly, where the tail assembly comprises at least one tail section. In some embodiments, the mission-adaptable aerial vehicle includes a propulsion unit at least partially contained in at least one of the tail assembly or the fuselage assembly and configured to drive flight of the aerial vehicle; and an electronics unit comprising a wireless transceiver device and a data processing unit in communication with a control unit of or interfaced with the propulsion unit. In some implementations, example embodiments of the bayonet mount system can be employed on one or more sections of at least one of the fuselage section(s), the wing section(s), the nose cone section(s), and/or the tail section(s).

The details of one or more embodiments of the bayonet mount system (and one or more embodiments of a mission-adaptable aerial vehicle) are set forth in the description below. The features illustrated or described in connection with one embodiment may be combined with the features of another embodiment or other embodiments. Thus, any of the various embodiments described herein can be combined to provide further embodiments. Other features, objects and advantages will be apparent from the description, the drawings, and the claims.

The subject matter described in this patent document can be implemented in specific ways that provide one or more of the following features.

DETAILED DESCRIPTION

Figure 1A:
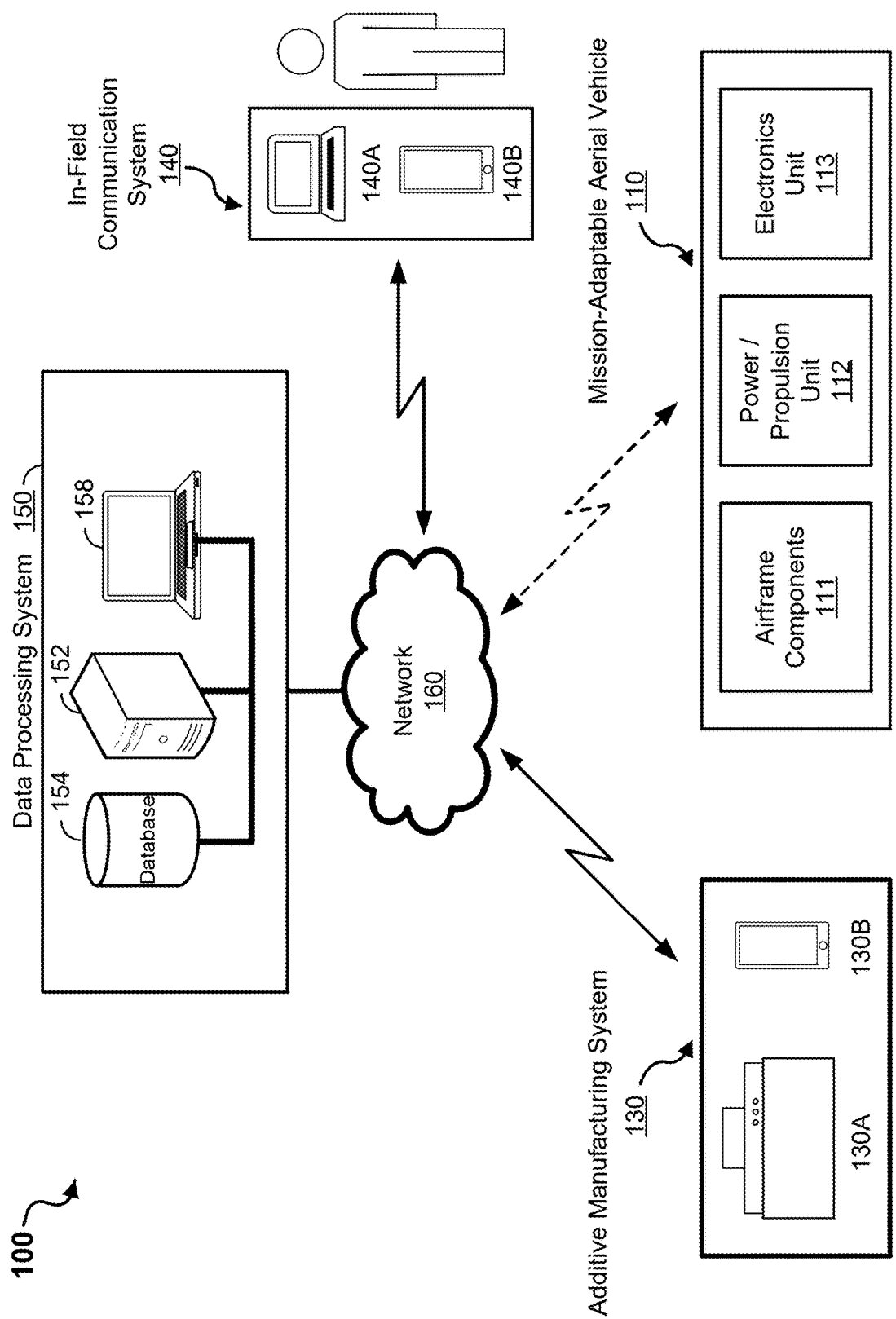
FIG. 1A shows a diagram of a mission-adaptable aerial vehicle system, in accordance with the present technology.

Unmanned aerial vehicles (UAV), also referred to as drones, and piloted aircraft of all sorts have been built for a single mission or several closely-related missions. This presents issues with requirements on the ground, in the field, and/or under duress changing regularly, which could mean that equipment painstakingly packed into position by human operators or delivered via expensive means (such as airdropping) becomes relatively useless given the changes to present mission needs.

With a mission-adaptable aerial system with interconnecting airframe sections and a special fastening system, an end-user in the field could add, remove, or move entire sections of the airframe of an aerial vehicle, thereby tailoring the aerial vehicle to the mission in the field and on-the-fly, e.g., on demand and in real time. Yet, key constraints or challenges to successfully executing the mission of the aerial vehicle may be the speed and accuracy of assembly of the airframe sections, e.g., particularly if the in-field assembly is to be performed in remote locations (where access to tools is limited or unavailable). In such or similar situations, it would be highly advantageous for the mission-adaptable aerial system to have airframe components that could attach (or reversibly attach/detach) and self-secure during assembly of the aerial vehicle without the use of tools and additional securement parts, e.g., screws, bolts, adhesives, etc., such that the assembled aerial vehicle possesses sufficient structural integrity to carry out the aerial mission (e.g., withstand detrimental forces during take-off, flight, and/or landing). Example embodiments of airframe structures with an integral, toolless fastening system for mission-adaptable aerial vehicles described herein aim to solve these and other problems.

Disclosed are specialized fastening systems integrated with airframe components for a mission-adaptable unmanned aerial vehicle (UAV) fabricated by rapid, low-cost additive manufacturing techniques that allow for toolless assembly of the airframe components when building the mission-adaptable UAV.

In some embodiments, a mission-adaptable aerial vehicle includes a fuselage assembly comprising one or more fuselage sections; a wing assembly reversibly attachable to the fuselage assembly, where the wing assembly comprises at least one wing section; a nose cone assembly reversibly attachable to the fuselage assembly, where the nose cone assembly comprises at least one nose cone section; and a tail assembly reversibly attachable to the fuselage assembly, where the tail assembly comprises at least one tail section. In some embodiments, the mission-adaptable aerial vehicle includes a propulsion unit at least partially contained in at least one of the tail assembly or the fuselage assembly and configured to drive flight of the aerial vehicle; and an electronics unit comprising a wireless transceiver device and a data processing unit in communication with a control unit of or interfaced with the propulsion unit. In some implementations, example embodiments of the bayonet mount system can be employed on one or more sections of at least one of the fuselage section(s), the wing section(s), the nose cone section(s), and/or the tail section(s).

In some embodiments, a mission-adaptable aerial vehicle includes a fuselage assembly comprising one or more fuselage sections; a wing assembly reversibly attachable to the fuselage assembly, the wing assembly including one or more wing sections; a nose cone assembly reversibly attachable to the fuselage assembly, the nose cone assembly including at least one nose cone section; a tail assembly reversibly attachable to the fuselage assembly, the tail assembly including at least one tail section, wherein at least one of the fuselage assembly, the wing assembly, the nose cone assembly, and/or the tail assembly includes an integral fastening system comprising a bayonet mount system for connecting two or more sections of one of the fuselage, wing, nose cone, or tail assemblies or two or more sections of at least two of the fuselage, wing, nose cone, or tail assemblies, where the bayonet mount system includes (i) one or more passageways comprising a first channel and second channel produced on an end region of a first airframe section, and (ii) one or more protrusions produced on an opposing end region of a second airframe section configured to be connected to the first airframe section at the end region, such that, when the airframe sections are to be assembled, the protrusion(s) align with an entry region of the first channel of the passageway(s) to be translated and then align with the second channel of the passageway(s) to be rotated to securely connect the first and second airframe sections together.

FIG. 1A shows a diagram of a mission-adaptable aerial vehicle system, labeled 100, in accordance with the present technology. The mission-adaptable aerial vehicle system 100 (also referred to as system 100) includes a data processing system 150 and one or more mission-adaptable aerial vehicle(s) 110. In some embodiments, the mission-adaptable aerial vehicle system 100 can include an additive manufacturing system 130. In some embodiments, the mission-adaptable aerial vehicle system 100 can include an in-field communication and/or computing system 140. In some embodiments, computing devices of the mission-adaptable aerial vehicle system 100 are in communication via a communications network 160.

In some embodiments, for example, the data processing system 150 can include one or more server computer devices 152, one or more databases 154, and/or one or more client computer devices 158, in data communication with each other (collectively referred to as "computing devices 152, 154, and/or 158"). In some implementations, for example, the computing devices 152, 154, and/or 158 can be configured to be in communication with each other through a closed or restricted network; whereas in some implementations, for example, at least some of the devices of the computing devices 152, 154, and/or 158 can be configured to be in communication with each other through a public network, such as the Internet. In some implementations, for example, the computing devices 152, 154, and/or 158 can be configured to be in communication with other computing devices of the system 100 external to the data processing system 150, such as computing devices of the additive manufacturing system 130, computing devices of the in-field communication and/or computing system 140, and/or mission-adaptable aerial vehicle(s) 110, via the network 160. In some implementations, for example, the computing devices 152, 154, and/or 158 can be configured to be in communication with other external devices (i.e., devices not part of the mission-adaptable aerial vehicle system 100) via the network 160 or other external network.

In some embodiments, for example, the additive manufacturing system 130 can include a 3D printer 130A and a client computer device 130B in data communication with the 3D printer 130A. The 3D printer 130A can include a binder jet printer operable to render a printed article comprising one or more of a polymer material, a composite material, a metal, and/or a ceramic based on instructions from one or more computer files, such as a computer-aided design (CAD) file or package. In some embodiments, the 3D printer 130A of the additive manufacturing system 130 can be embodied as a 3D rendering device for a 3D printing or additive manufacturing method, including but not limited to fused deposition modeling (FDM), laser powder bed fusion, selective laser sintering, selective laser melting, digital light processing, binder jetting, jetting, volumetric, direct laser metal sintering, and/or automated continuous fiber placement.

In some embodiments, the materials in the 3D-rendered component of the mission-adaptable aerial vehicle(s) 110 by the additive manufacturing system 130 can include, but not limited to, PA-12 (polyamide-12, a nylon-like material), acrylonitrile butadiene styrene (ABS), polylactic acid (PLA), acrylonitrile styrene acrylate (ASA), polyethylene terephthalate (PET), polyethylene terephthalate glycol (PETG), polycarbonate (PC), polypropylene (PP), polyether ether ketones (PEEK), polyether ether ketone ketones (PEKK), ULTEM™, other nylons, thermoplastic polyurethane (TPU), and/or thermoplastic elastomer (TPE), or a combination of any of the aforementioned or subsequent-mentioned thereof, which can be in the form of powder, resin, and/or filament or other form; and/or composites that can be in the form of glass or other material beads added to the powder, resin, or filament materials, and/or likewise chopped fibers infused in the same feedstock. The client computer device 130B can be embodied as a personal computer (e.g., desktop computer or laptop computer) and/or a mobile communication device, including but not limited to a smartphone, a smart wearable (like a smartwatch, smart glasses, etc.), tablet, a personal digital assistant (PDA), etc., or other computer device.

In some embodiments of the system 100, for example, at least some of the client computer device(s) 130B can include a software application ("app") that is resident on the respective device to control various data processing, storage, and communication functionalities for the additive manufacturing system 130. In some implementations, for example, an end-user can utilize the app to communicate with the data processing system 150 to access a library of specifications and data associated with airframe sections and subsystems for the mission-adaptable aerial vehicle(s) 110, e.g., which can be stored in the one or more databases 154 of the data processing system 150. For example, the library can include part files in CAD or mesh file formats, allowing for a user to print specific airframe elements for initial vehicle creation, spare parts, or replacement parts. The user would also be able to receive new part files (e.g., no library items, custom items) from the data processing system 150 and/or a client thereof, such as a decentralized computer network (e.g., via network 140). The library of the disclosed technology can be an ever-changing, ever-expanding resource of airframe and aircraft components printable on the various print processes in accordance with the additive manufacturing system 130.

In some embodiments, for example, the in-field communication and/or computing system 140 can include a computer device 140 operable by an in-field user, where the computer device 140 can be embodied as a transportable personal computer 140A (e.g., laptop computer) and/or a mobile communication device 140B, including but not limited to a smartphone, a smart wearable (like a smartwatch, smart glasses, etc.), a tablet, PDA, etc.; or other computer device. In some embodiments of the system 100, for example, the computer device 140 can include a software application ("in-field app") that is resident on the computer device 140 to control various data processing, storage, and communication functionalities for the in-field assembly and/or use (e.g., launch, flight programming and/or flight control, landing, re-charging and/or re-fueling, payload loading, or other tasking procedure) by the in-field user. For example, the in-field app can be used to provide in-the-field instructions to assemble at least some individual components of the mission-adaptable aerial vehicle 110 that the in-field user may be storing and/or transporting on foot in the field (e.g., via a backpack, case, etc.) or by a land or sea vehicle (e.g., via a case, trunk, storage unit, etc.). In some implementations, for example, the in-field user can utilize the in-field app to communicate with the data processing system 150 to access data associated with a mission of the aerial vehicle. In some implementations, the computer device 140 can be used to interface with an electronics unit of the mission-adaptable aerial vehicle(s) 110 via a wired or wireless communication interface.

The mission-adaptable aerial vehicle(s) 110 can include an unmanned aerial drone operable to travel by its designed drive or propulsion systems based on navigation technology that can be programmable and fully-autonomous or semi-autonomous. The mission-adaptable aerial vehicle(s) 110 includes a plurality of modularized, mission-adaptable airframe components 111. For example, in some implementations, the airframe components 111 can be distributed into multiple (relatively) light weight sections of the overall aerial vehicle 110 (e.g., 25 lbs. to 250 lbs.) that are packable (e.g., in backpacks and hard cases) for transport into various locations in various ways, such as by an end-user on foot or by vehicle. In some embodiments, for example, the mission-adaptable aerial vehicle(s) 110 may include a power and/or propulsion unit 112. For example, in such embodiments, the power and/or propulsion unit 112 can include one or more batteries, one or more fuel cells, one or more engines, or other embodiments of a powerplant for the aerial vehicle(s) 110. In some example embodiments, the power and/or propulsion unit 112 may include at least one of: (i) a turbo jet engine, (ii) a propeller-driven engine (e.g., internal combustion engine) used for long range, long loiter flights, and/or (iii) an electric ducted fan (EDF) engine. In some embodiments, for example, the mission-adaptable aerial vehicle(s) 110 may include an electronics unit 113. For example, in such embodiments, the electronics unit 113 can include a wireless communications unit (e.g., such as a wireless transceiver) and/or a location tracking unit, e.g., including a Global Positioning System (GPS), cellular communication device for cellular triangulation tracking, or other. Additionally or alternatively, in such embodiments, the electronics unit 113 may include a data processing unit (comprising a processor, memory, and input/output interface) that is in data communication with the location tracking unit and the wireless communication unit.

In some embodiments in accordance with the present technology, the mission-adaptable aerial vehicle(s) 110 include airframe sections having an integral fastening system additively manufactured into the respective airframe sections. In some embodiments, the integral fastening system can include a bayonet mount system, as described above and/or described below (for example, in connection with FIGS. 3A-3D). In some embodiments, an example bayonet mount system includes (i) one or more bayonet passageways produced on an indented ledge region at, at least, one end of the airframe section, and (ii) one or more (corresponding) bayonet protrusions produced on a side of an end region of an adjacent airframe section, such that, when the airframe sections are to be assembled, the bayonet protrusion(s) align with the outer, entry region of the bayonet passageway(s) and can be translated and rotated within the passageway(s) to securely connect the airframe sections together. Example embodiments of the bayonet mount system are discussed in further detail below.

In some embodiments of the system 100, the mission-adaptable aerial vehicle(s) 110 are in communication with the client computer device 130B and/or in-field computer device 140 via the network 160 and/or in direct communication, such as through a wireless interface or wired interface, with the client computer device 130B and/or in-field computer device 140. In some embodiments, for example, the network 160 is a public network, such as the Internet (e.g., where the network of computers in communication with each other is also referred to as the "cloud"). In some embodiments, for example, the network 160 is a private network, where the computers in communication with each other are highly secure and restricted from use by unauthorized users and devices, e.g., such as a military network, like the Advanced Research Projects Agency Network (ARPANET) or portions thereof like the MILNET, or SIPRnet, or NIPRnet, or other.

Figure 1B:
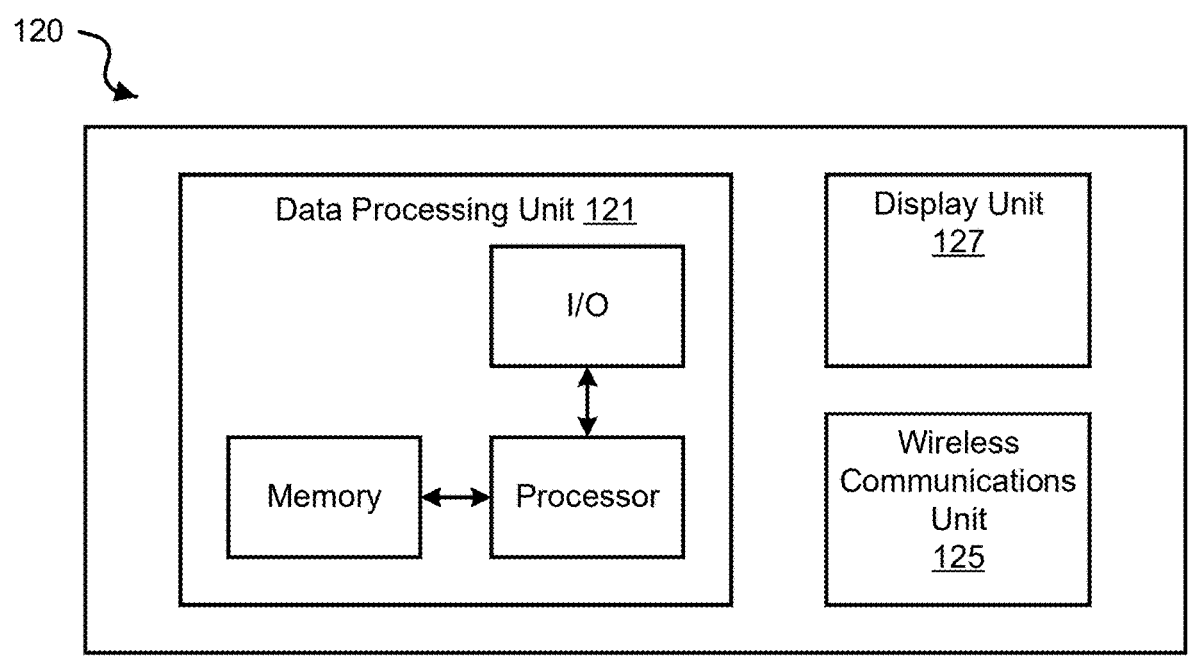
FIG. 1B shows a block diagram of an example embodiment of a data processing device for a computing unit, module or device in accordance with the present technology.

FIG. 1B shows a block diagram of an example embodiment of a data processing device, labeled 120, for a computing unit, module or device described in the present disclosure. The data processing device 120 may be embodied by a computer or computing device of the data processing system 150, the client computer device 130B of the additive manufacturing system 130, the in-field computer device 140 of the in-field communication and/or computer system 140, and/or the (optional) wireless communications unit and/or electronics unit of the mission-adaptable aerial vehicle(s) 110. The data processing device 120 can include a data processing unit 121, which comprises one or more processor(s) to process data, one or more memory unit(s) in communication with the processor(s) to store data, and an input/output unit (I/O) to interface the processor(s) and/or memory unit(s) to other modules, units or devices of the data processing device 120 or external devices. For example, the processor(s) can include a central processing unit (CPU), a microcontroller unit (MCU), a graphics processing unit (GPU), or other. For example, the memory unit(s) can include and store processor-executable code, which when executed by the processor(s), configures the data processing unit 121 to perform various operations, e.g., such as receiving information, commands, and/or data, processing information and data, and transmitting or providing information/data to another device. In some implementations, the data processing unit 121 can transmit raw or processed data to a computer system or communication network accessible via the Internet ('the cloud') that includes one or more remote computational processing devices (e.g., servers in the cloud). To support various functions of the data processing unit 121, the memory unit(s) can store information and data, such as instructions, software, values, images, and other data processed or referenced by the processor(s). For example, various types of Random Access Memory (RAM) devices, Read Only Memory (ROM) devices, Flash Memory devices, and other suitable storage media can be used to implement storage functions of the memory unit(s).

In some embodiments, the data processing device 120 can include a wireless communication unit 125. For example, in some implementations, the I/O of the data processing unit 121 can interface the data processing unit 121 with the wireless communications unit 125 to utilize various types of wired or wireless interfaces compatible with typical data communication standards, for example, which can be used in communications of the data processing unit 121 with other devices, via a wireless transmitter/receiver (Tx/Rx) unit, e.g., including, but not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE cellular communication methods, NFC (Near Field Communication), and parallel interfaces.

The I/O of the data processing unit 121 can also interface with other external interfaces, sources of data storage, and/or visual or audio display devices, etc. to retrieve and transfer data and information that can be processed by the processor(s), stored in the memory unit(s), or exhibited on an output unit of the data processing device 120 or an external device. For example, in some embodiments, the data processing device 120 can optionally include a display unit 127 configured to be in data communication with the data processing unit 121, e.g., via the I/O, to provide a visual display, an audio display, and/or other sensory display that produces a user interface of a software application in accordance with the mission-adaptable aerial vehicle system 100. In some examples, the display unit 127 can include various types of screen displays, speakers, or printing interfaces, e.g., including but not limited to, light emitting diode (LED), or liquid crystal display (LCD) monitor or screen, cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

Figure 2:
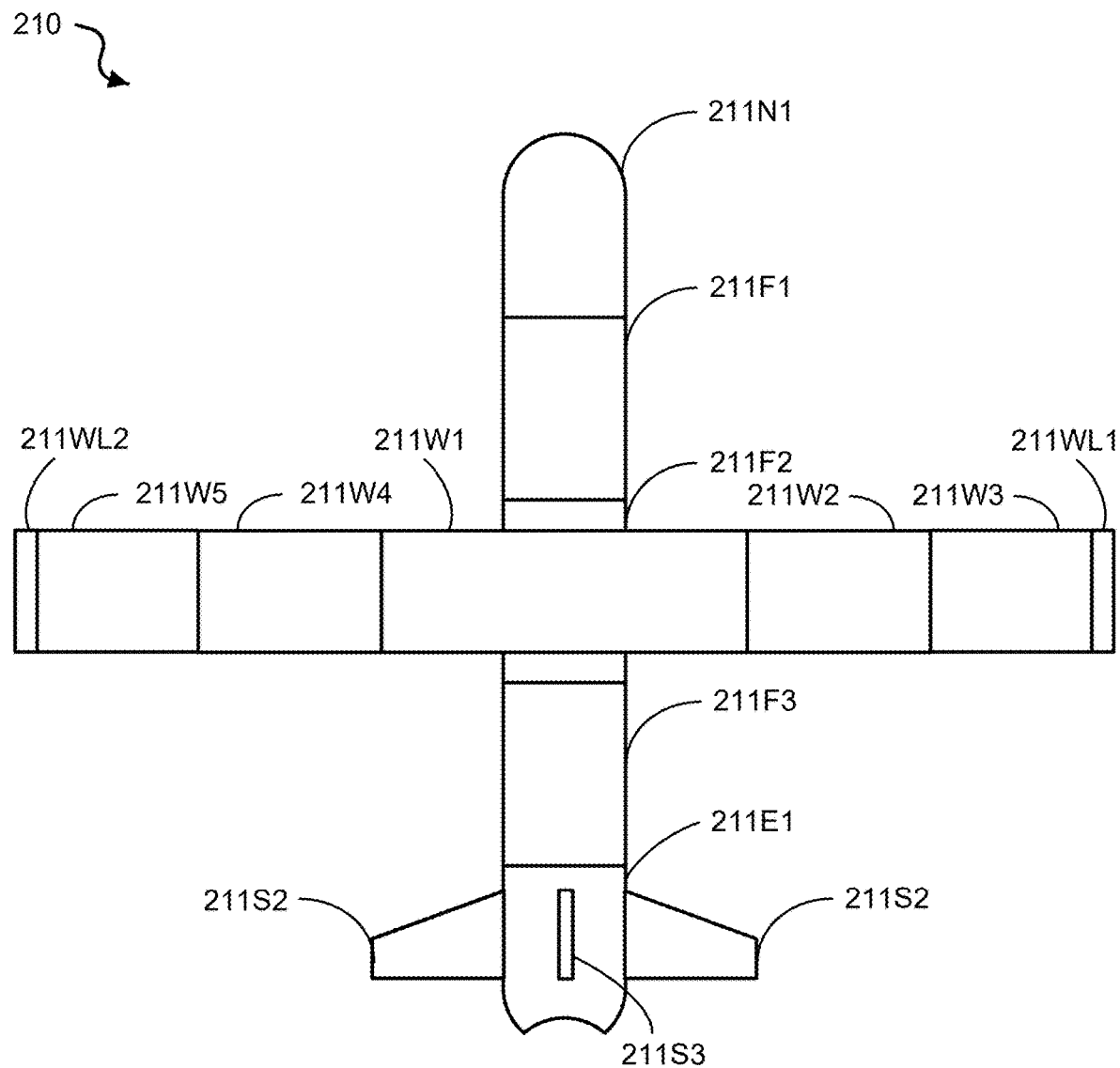
FIG. 2 shows a diagram of an example embodiment of a mission-adaptable aerial vehicle, in accordance with the present technology.

FIG. 2 shows a diagram of an example embodiment of the mission-adaptable aerial vehicle 110, labeled 210. The mission-adaptable aerial vehicle 200 includes a plurality of airframe components 211, including at least one fuselage assembly comprising at least one fuselage section, at least one wing assembly, a nose cone assembly, and an empennage assembly. The nose cone assembly can be configured in a variety of geometries and include various modules, such as an imaging module (comprising one or more cameras that are in communication with the electronics unit 113 (not shown)), a sensor module (comprising one or more sensors including but not limited to a motion sensor, a pressure sensor, a temperature sensor, or other sensor, which are in communication with the electronics unit 113 (not shown)), and/or other modules or payloads to be carried by the aerial vehicle 210. The at least one fuselage section of the fuselage assembly can be configured in a variety of geometries and include an at least partially hollowed interior usable for a various purposes, such as to contain payload(s) and energy sources of the aerial vehicle 210, as well as store components of the electronics unit 113 and/or power/propulsion unit 112, supplies, or other articles (not shown in FIG. 2). The wing assembly can be designed into multiple extension modules to adjust aspect ratio, wing loading, loitering times, and ranges for flight of the aerial vehicle 210 and/or to carry various ranges of weight and/or volume for various mission parameters.

In the example shown in the diagram of FIG. 2, the mission-adaptable aerial vehicle 210 includes a nose cone section 211N1 coupled with a fuselage assembly including fuselage sections 211F1, 211F2, and 211F3, i.e., the nose cone section 211N1 is coupled with fuselage section 211F1. The mission-adaptable aerial vehicle 210 includes an empennage assembly including a tail section 211E1 coupled with the fuselage assembly, i.e., the tail section 211E1 is coupled with fuselage section 211F3. As shown in FIG. 2, the tail section 211E1 may include horizontal stabilizers 211S2 and vertical stabilizer 211S3. The mission-adaptable aerial vehicle 210 includes a wing assembly that includes wing sections 211W1, 211W2, 211W3, 211W4, and 211W5. The wing section 211W1 is coupled with fuselage section 211F2. Wing sections 211W3 and 211W5 are configured as end-wing segments, and, in some embodiments, may each optionally include a winglet assembly 211WL1 and 211WL2, respectively. In some embodiments of the mission-adaptable aerial vehicle 210, for example, one or more include airframe section assemblies (e.g., fuselage assembly, wing assembly, nose cone assembly, tail assembly) has an example embodiment of an integral fastening system additively manufactured into one or more of its respective airframe section(s). In some embodiments, the integral fastening system can include a bayonet mount system, such as the example embodiments of the bayonet mount system discussed below.

Example Embodiments of Integral Bayonet Mount System for Airframe Sections

In some embodiments in accordance with the present technology, an integral fastening system for a mission-adaptable aerial vehicle in accordance with the present technology includes a bayonet mount system that includes a passageway on a first outer region (e.g., exterior-facing side of an indented ledge) of a first airframe section, and a protrusion (e.g., lug) that is produced on a side (e.g., an interior-facing side or exterior facing side) of a second outer region of a second airframe section. The passageway includes a first channel that is (i) perpendicular with or (ii) at an angle (e.g., acute angle) to the perpendicular of a circumference of the first outer region (e.g., on the indented ledge) of the first airframe section, and a second channel connected with the first channel and is (i) radially parallel with the circumference of the first outer region or (ii) at an angle between the perpendicular and the circumference less than 90 degrees. The protrusion is configured to align with and be translated into the first channel and subsequently be rotated within the second channel to securely connect the first and second airframe sections together.

In some embodiments, the bayonet mount system includes a locking assembly that includes a deflection tab disposed at the first outer region of the first airframe section and a corresponding slot (e.g., notch or through-hole) in the second outer region of the second airframe section, where the deflection tab is configured to deflect radially (in a direction toward the interior of the airframe) when depressed by a contact surface of the second outer region of the second airframe section as the protrusion is translated and rotated within the first and second channels, respectively, of the passageway of the first outer region of the first airframe section, such that when the deflection tab is aligned with the corresponding slot, the deflection tab returns to its initial state that projects into the slot, thereby locking the first and second airframe sections together.

In some embodiments, the bayonet mount system includes a plurality of passageways on the first airframe section and a plurality of corresponding protrusions on the second airframe section. In some embodiments, the bayonet mount system includes a plurality of deflection tabs and a plurality of corresponding slots. In some embodiments, the deflection tab(s) is/are positioned on the first airframe section and the slot(s) is/are positioned on the second airframe section; whereas, in some embodiments, the deflection tab(s) is/are positioned on the second airframe section and the slot(s) is/are positioned on the first airframe section.

For example, the disclosed bayonet mount system provides an integrally printed airframe connection solution that is simple to assemble and requires no tools. In some embodiments, a bayonet mount system includes one or more protrusions (e.g., lug(s), pin(s), nub(s) or other projection component) additively manufactured as part of the airframe sections that can freely be inserted into and rotated through one or more corresponding receptor components/features (e.g., slot(s), channel(s), etc.) also additively manufactured as part of the airframe sections, which secures the connection of airframe sections during their assembly in a manner that keeps the airframe sections very tightly connected. Tight, secure connection can be achieved with tight tolerances, fillets, smooth surfaces, and surface draft angles of the bayonet mount system's protrusion(s) and receptor(s).

Furthermore, to lock pieces to one another without using separate fastener hardware and without the need for assembly tools, integrally printed deflection tabs and opposing slots can also be additively manufactured as part of the airframe sections for a snap-fit lock of the connected airframe sections. For example, to achieve the snap-fit locking capability, the deflection tab is structurally designed to have a ramp angle protrusion height, a tab thickness, and a tab width, which can be in combination with selection of the deflection tab material (e.g., polymer) having particular material properties including modulus of elasticity, elongation at break, and flexural modulus, such that the ramp protrusion portion of the deflection tab is depressible as the two opposing ends of a first airframe structure and a second airframe structure are being connected and returnable to its initial protruding position when interfaced with an opposing slot. For instance, as an example lug traverses in the channel of an exemplary bayonet mount system, the deflection tab's ramp protrusion is depressed, including when the lug begins rotating in the final portion of the channel (e.g., L-like shaped passageway); and once the lug of the first airframe section is fully rotated the final portion of the channel of the second airframe section such that the mating is completed, the ramp protrusion on the deflection tab moves into the cavity (of the slot) to allow the tab to spring back into its unloaded/unstressed/relaxed configuration due to the material's resistance to bending/flexural modulus, and stiffness/modulus of elasticity.

In some embodiments of the locking system, for example, the thickness of the deflection tab wall can be at least 1 mm, e.g., a thickness between 1 mm and 25 mm. For example, the width of the deflection tab needs to stand up to 1000s of loading/unloading cycles and to be strong enough to endure multiple Gs experienced in flight. In some embodiments of the locking system, for example, the width of the deflection tab can be between 5 mm and 50 mm. In some embodiments of the locking system, for example, the ramp angle can be between 5° and 60°.

Figure 3A:
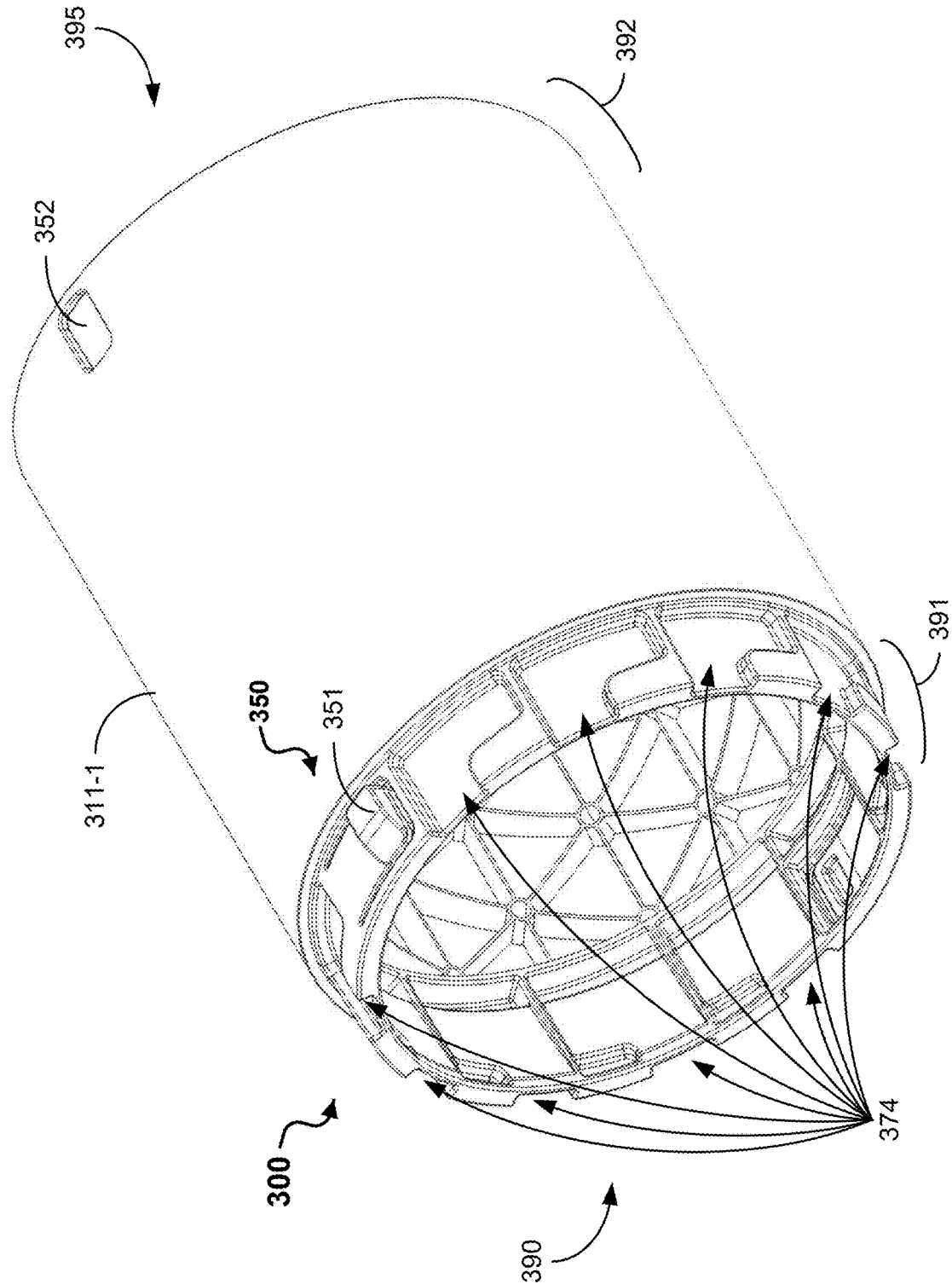
FIG. 3A-3D show diagrams illustrating an example embodiment of an integral fastening system including a bayonet mount system, in accordance with the present technology.
Figure 3B:
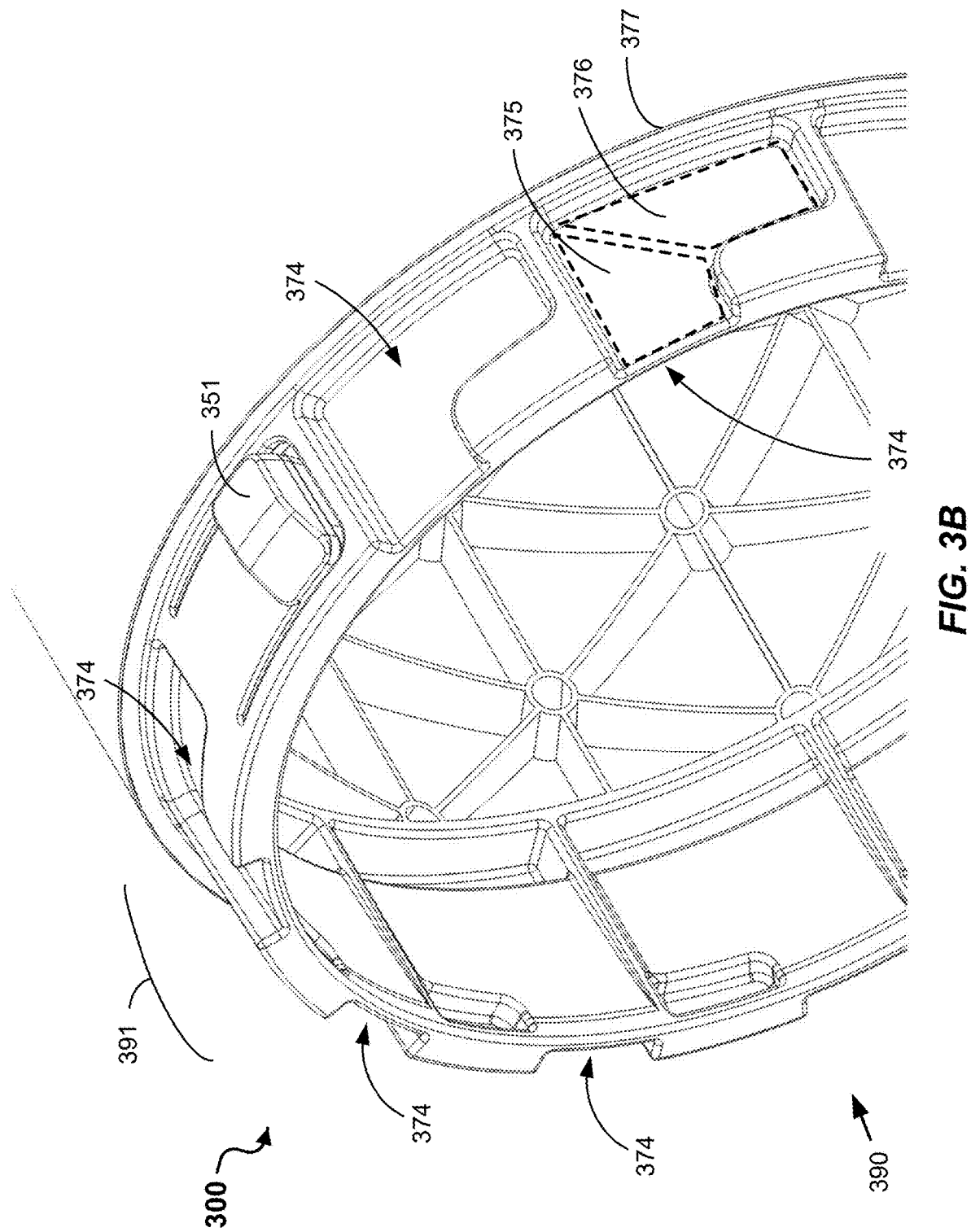
Figure 3C:
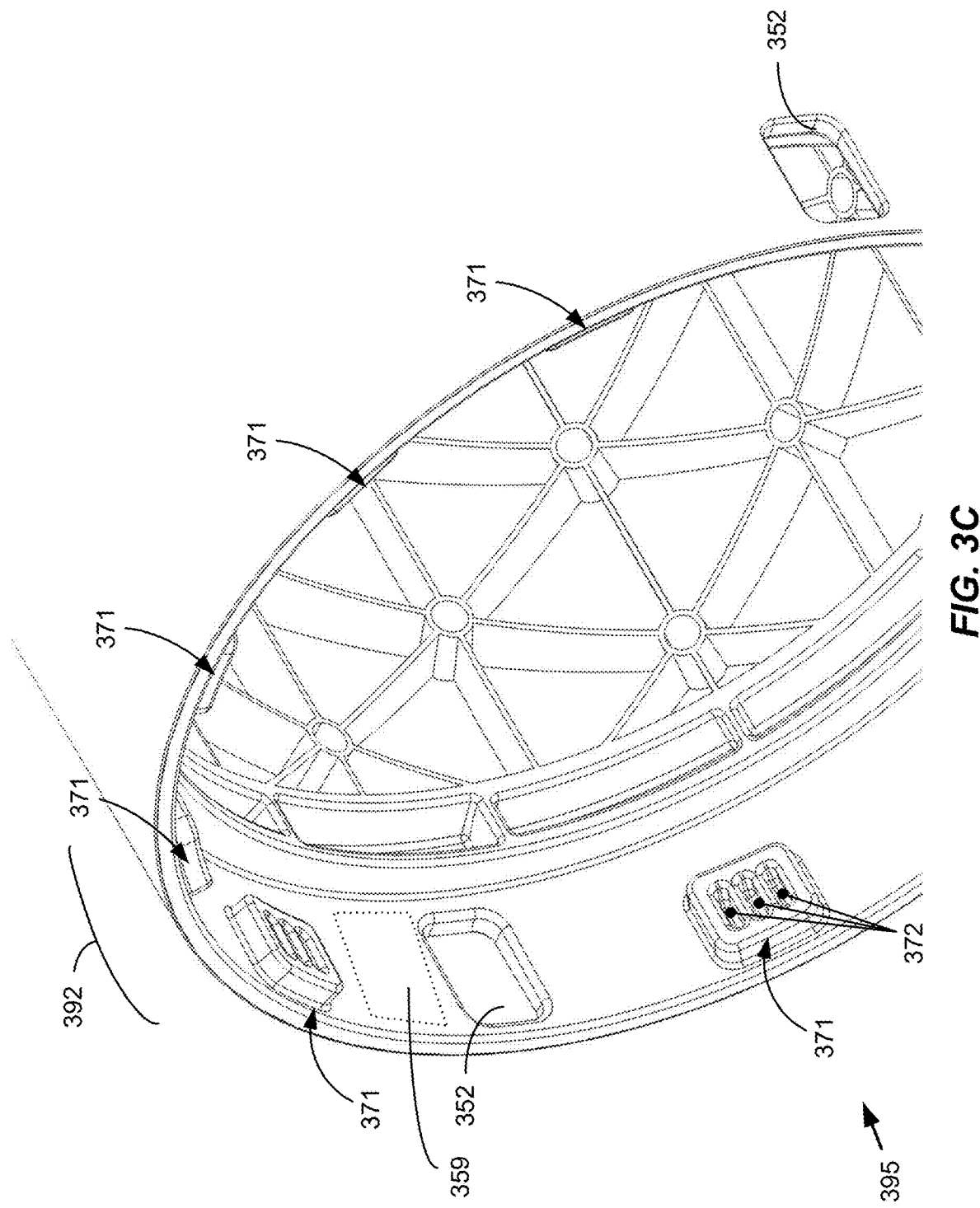
Figure 3D:
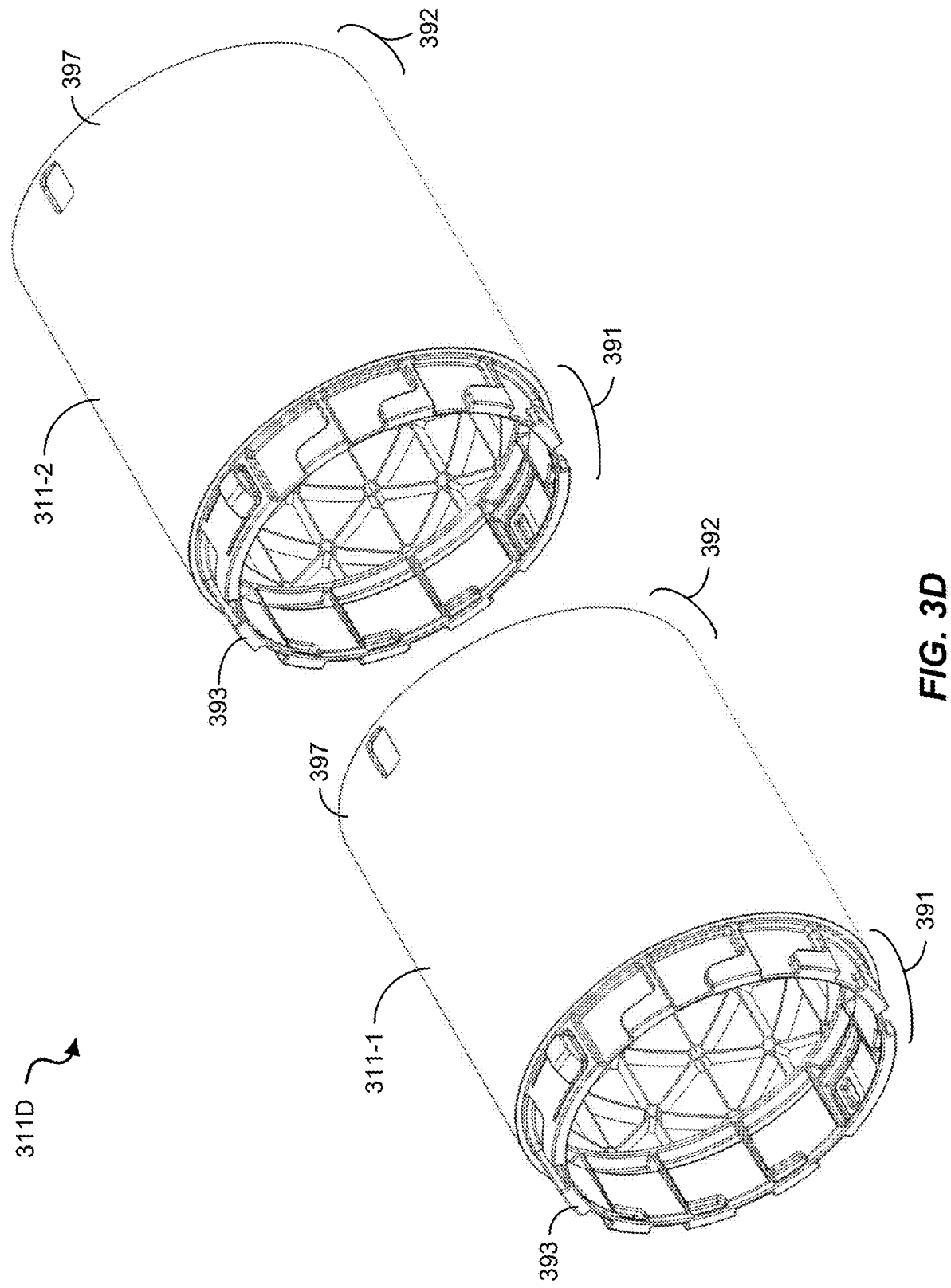

FIGS. 3A-3D show diagrams of an example embodiment of a bayonet mount system in accordance with the present technology, labeled 300. FIG. 3A shows a perspective view from one end 390 of an example airframe component (e.g., fuselage section) comprising the integral bayonet mount system 300. FIG. 3B shows a zoomed view of illustration in FIG. 3B. FIG. 3C shows a zoomed perspective view from another end 395 of the example airframe component comprising the integral bayonet mount system 300. FIG. 3D shows a perspective view of two separated example airframe components that each include the integral bayonet mount system 300, which are configured to be assembled together and securely connected by the integral bayonet mount system 300.

In some embodiments, the bayonet mount system 300 includes one or more protrusions 371 that are produced (e.g., additively manufactured) as part of an airframe component or section 311 (e.g., a fuselage section or a wing section or other airframe section) on a second end region 392 of the airframe section 311, and one or more passageways 374 that are produced (e.g., additively manufactured) as part of the airframe component or section 311 on a first end region 391 of the airframe section 311. The one or more protrusions 371 of the airframe section 311 are configured to align with and be moved within the corresponding one or more passageways 374 (of a separated, adjacent airframe component) to securely connect airframe sections together.

In some embodiments, for example, the bayonet mount system 300 can include a locking assembly 350 that includes one or more deflection tabs 351 disposed at or proximate to the first end region 391 and corresponding one or more slots 352 disposed at or proximate to the second end region 391, such that the deflection tab(s) 351 is/are configured to initially deflect radially (in a direction toward the interior of the airframe) when depressed by a contact surface when the one or more protrusions 371 are interfaced with the one or more passageways 374 and subsequently project back to its/their prior position(s) when the deflection tab(s) 351 is/are aligned with the corresponding slot(s) 352, thereby locking the airframe sections together.

Referring to FIG. 3B, in some embodiments of the bayonet mount system 300, for example, the one or more passageways 374 include a first channel 375 and second channel 376, e.g., shown by broken lines in one of the exemplary passageways 374 illustrated in FIG. 3B. In various embodiments of the one or more passageways 374, for example, the area and volume of the first channel 375 may overlap with area and volume of the second channel 376. For example, in some embodiments, the first channel 375 can be configured to be (i) perpendicular with or (ii) at an acute angle to the perpendicular of a circumference 377 of the end region 391; and/or the second channel 376, connected with the first channel 375, can be configured to be (i) radially parallel with the circumference 377 or (ii) at an angle between the perpendicular and the circumference 377 that is less than 90 degrees (e.g., between 60 degrees and 89.99 degrees).

Referring to FIG. 3C, in some embodiments of the bayonet mount system 300, for example, the one or more protrusions 371 are configured as a lug, a pin, a nub, or other projection structure that is produced on a side (e.g., an interior-facing side as shown in FIG. 3C, or an exterior facing side (not shown)) of the second end region 392 of the airframe section 311. In example implementations of the bayonet mount system 300, for example, the one or more protrusions 371 of one airframe section 311 are configured to first be aligned with an entry region of the first channel 375 of corresponding one or more passageways 374 of another airframe section 311 to be translated (or partially translated and partially rotated) in the first channel 375 so as to align with the second channel 376 to be rotated (or partially rotated and partially translated) so as to securely connect the airframe sections together.

In some embodiments, for example, at least one or some of the one or more protrusions 371, such as the example lugs shown in FIG. 3C, can optionally include one or more cavities 372 on a top surface of the lug(s), which the one or more cavities 372 can be sized and shaped to interface with one or more corresponding bumps or nubs (not shown) in a location of the second channel 376 of the corresponding passageway(s) 374 within which the lug(s) having the cavity(ies) 372 is positioned after completing the traversal through the first channel 375 and the second channel 376 of the corresponding passageway(s) 374. In implementations of the example (optional) embodiment of the one or more protrusions 371, for example, the one or more corresponding bumps or nubs and interfacing one or more cavities 372 can provide a tactile or auditory indication that the two airframes have been completely connected by the bayonet mount system 300, as well as ancillary locking force in addition to the mechanical forces imparted the bayonet mounting system 300 due to the physical shape and structure and material properties of the one or more protrusions 371 and the one or more passageways 374. Moreover, for example, the optional one or more cavities 372 can provide additional reduction of weight (light-weighting) to the airframe section 311.

Referring to FIG. 3D, two examples of the airframe section 311 are shown as a first fuselage section 311-1 and a second fuselage section 311-2. In some embodiments of the bayonet mount system 300, for example, the first end region 391 can be configured an indented ledge 393, e.g., indented inwardly toward the interior of the airframe section, such that the one or more passageways 374 are configured on an outward-facing surface of the indented ledge 393. In such embodiments, for example, the one or more protrusions 371 (shown in FIG. 3C and not shown in FIG. 3D) can be on an inward-facing surface of the second end region 392, where an inward-facing surface of the peripheral wall 397 of the airframe section 311-1 at the second end region 392 is configured to abut and slide over the indented ledge 393 of the first end region 391 for the airframe section 311-2 that is (adjacently aligned) to be assembled with (connected to).

Referring to FIGS. 3B and 3C, as noted above, in some embodiments, the bayonet mount system 300 can include the locking assembly 350, where the one or more deflection tabs 351 are disposed at or proximate to (one or both of) the first end region 391 and/or the second end region 392 of the airframe section 311; and the corresponding one or more slots 352 are disposed at or proximate to (one or both of) the second end region 392 and/or the first end region of the airframe section 311. In some embodiments, for example, the deflection tab 351 can be configured as a cantilever tab having a tab protrusion coupled to a cantilever arm (like the example shown in FIGS. 3A-3D).

In some implementations of the locking assembly 35, for example, the one or more deflection tabs 351 is configured to deflect radially when depressed by a contact surface 359 (shown in FIG. 3C) proximate the corresponding one or more slots 352 of the respective airframe section 311 when the one or more protrusions 371 is translated and rotated within the first channel 375 and the second channel 376, respectively, of the one or more passageways 374 of the other corresponding airframe section. In this manner, for example, when the one or more deflection tabs 351 is aligned with the corresponding one or more slots 352, the one or more deflection tabs 351 is returned to an initial projection state to project into the corresponding one or more slots 352 (since the force from the contact surface 359 that depressed the deflection tab 351 is released after the deflection tab 351 is no longer in contact with the contact surface 359), thereby locking the airframe sections together.

In some embodiments, for example, the deflection tab 351 can be configured as an annular tab (not shown) having a curved surface that is deflectable until an applied load is released when the annular tab is received in the corresponding slot 352 (e.g., which can be shaped with a corresponding curved surface). In some embodiments, for example, the deflection tab 351 and corresponding slot 352 can be configured as a torsional tab assembly (not shown) having a passageway for the torsional tab component to partially-rotativity deflect under contact force by a wall of the passageway until aligned with a lateral slot to receive the torsional tab.

In some embodiments of the mission adaptable aerial vehicles, the airframe structures can include an iso-grid lattice pattern that include a plurality of interconnected protrusions (e.g., walls) that form a lattice pattern where stress concentration is collected at the radii of the interconnected protrusions forming the iso-grid. In some embodiments, like that show in FIGS. 3A-3D, the iso-grid lattice pattern can be configured as a hexagonal pattern where six protrusions span off a central radius or point and interface with five other protrusions at a different central radius. Example embodiments of the iso-grid lattice pattern are not limited to the example hexagonal iso pattern shown in FIGS. 3A-3D, and may include other lattice patterns including but not limited to a pentagonal pattern, a quad pattern, and octagonal pattern, or other patterns where the protrusions are linear or curved between interconnected radii.

Further example embodiments of aspects of an integral fastening system and of mission-adaptable aerial vehicle devices, systems, and methods for fabrication, transport, assembly and/or use are described below in further detail and in U.S. Patent Application Publication No. 2024/0092510 A1, titled "MISSION-ADAPTABLE AERIAL VEHICLE AND METHODS FOR IN-FIELD ASSEMBLY AND USE," which is incorporated as part of the disclosure of this patent document.

Figure 4:
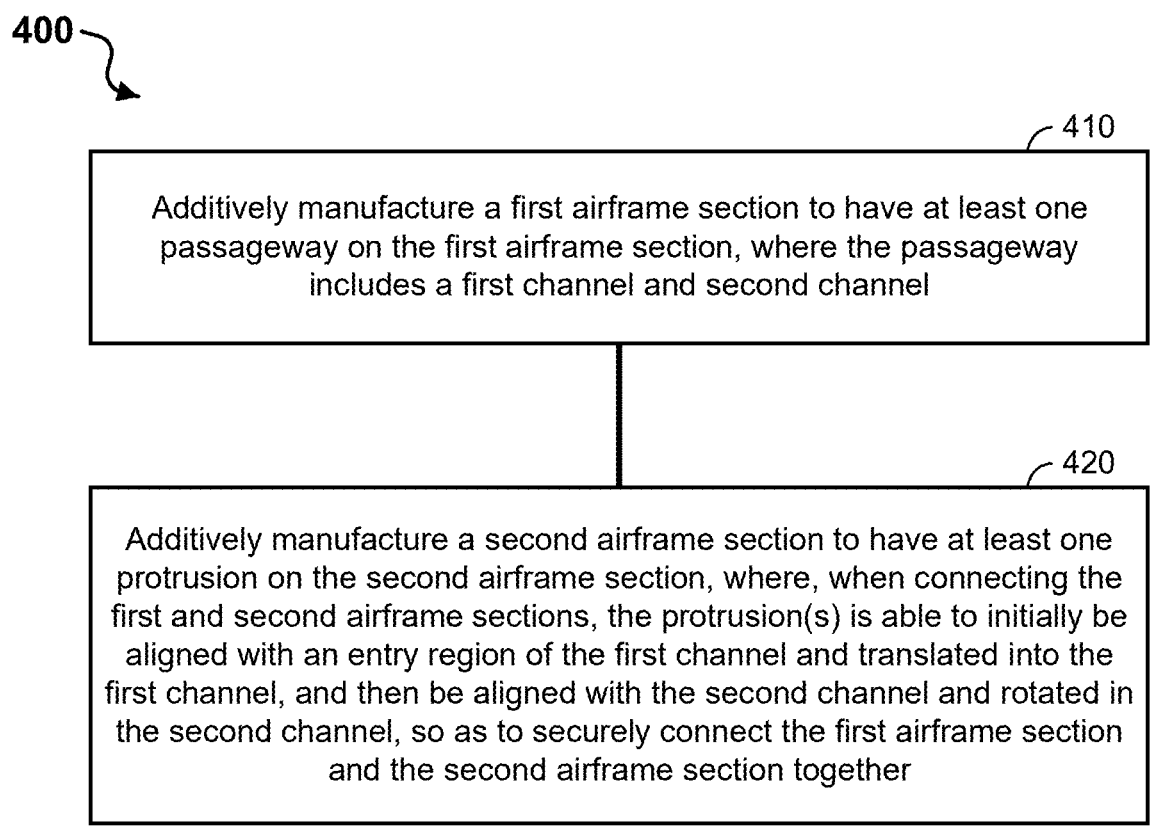
FIG. 4 shows a diagram depicting an example embodiment of a method of manufacturing interconnecting airframe structures for a mission-adaptable aerial vehicle, in accordance with the disclosed technology.

FIG. 4 shows a diagram depicting an example embodiment of a method 400 of manufacturing interconnecting airframe structures for a mission-adaptable aerial vehicle, in accordance with the disclosed technology. The method 400 includes a process 410 to additively manufacture a first airframe section to have at least one passageway (e.g., one or more passageways) on the first airframe section. In some embodiments, the passageway (e.g., each of the one or more passageways) includes a first channel and second channel. The method 400 includes a process 420 to additively manufacture a second airframe section to include a protrusion (e.g., one or more protrusions) on the second airframe section. The protrusion (e.g., each of the one or more protrusions) and the passageway (e.g., each of the one or more passageways) that are additively manufactured on the second airframe section and the first airframe section, respectively, are configured to facilitate the connection of the first and second airframe sections together. For instance, the protrusion of the second airframe section is configured to align with an entry region of the first channel of the one or more passageways of the first airframe section when the first and second airframe sections are to be assembled, such that, after alignment, the protrusion of the second airframe section is to be translated into the first channel, and then be aligned with the second channel so that the protrusions can be rotated in the second channel, thereby securely connecting the first airframe section and the second airframe section together.

In various embodiments of the method 400, for example, the first airframe section and the second airframe section each includes one section of a fuselage assembly, a wing assembly, a nose cone assembly, or a tail assembly of an aerial vehicle. For instance, the first airframe section can include a first fuselage section, and the second airframe section can include a second fuselage section. For instance, the first airframe section can include a fuselage section, and the second airframe section can include a tail section. For instance, the first airframe section can include a fuselage section, and the second airframe section can include a nose cone section. For instance, the first airframe section can include a fuselage section, and the second airframe section can include a wing section.

In some embodiments of the method 400, the process 410 to additively manufacture the first airframe section and the second airframe section can include 3D-printing one or both of the first airframe section and the second airframe section. In some embodiments of the method 400, the process 420 to additively manufacture the first airframe section and the second airframe section can include injection molding one or both of the first airframe section and the second airframe section.

In some embodiments of the process 410, for example, the one or more passageways is additively manufactured on an end region of the first airframe section. In some embodiments of the process 420, for example, the one or more protrusions is additively manufactured on an end region of the second airframe section.

In some embodiments of the process 410, for example, the one or more passageways is additively manufactured on a non-end region of the first airframe section (e.g., at a location away from the end region along a wall of the first airframe section). In some embodiments of the process 420, for example, the one or more protrusions is additively manufactured on a non-end region of the second airframe section (e.g., at a location away from the end region along a wall of the second airframe section). For instance, the first and second airframe sections can be configured to connect where one of the airframe sections overtakes the other (e.g., has a larger radius or perimeter) such that the passageway(s) and protrusion(s) are able to connect via interaction of the overtaking or overlapping walls of the airframe sections.

In some embodiments of the method 400, for example, the processes 410 and 420 include additively manufacturing a locking assembly on the first airframe section and the second airframe section. Various embodiments of the locking assembly can be additively manufactured by the processes 410 and 420. In some embodiments of the method 400, the processes 410 and 420 to additively manufacture the locking assembly includes additively manufacturing one or more deflection tabs disposed on the first airframe section; and additively manufacturing one or more slots disposed on the second airframe section, or vice versa. For example, the one or more deflection tabs is configured to deflect radially when depressed by a contact surface of the second airframe section when the one or more protrusions is being translated and rotated within the first channel and the second channel, respectively, such that when the one or more deflection tabs is aligned with corresponding one or more slots, the one or more deflection tabs is returned to an initial projection state to project into the corresponding one or more slots, thereby locking the first airframe section and the second airframe section together. Or, for example, the one or more deflection tabs is configured to deflect radially when depressed by a contact surface of the first airframe section when the one or more protrusions is being translated and rotated within the first channel and the second channel, respectively, such that when the one or more deflection tabs is aligned with corresponding one or more slots, the one or more deflection tabs is returned to an initial projection state to project into the corresponding one or more slots, thereby locking the first airframe section and the second airframe section together.

EXAMPLES

In some embodiments in accordance with the present technology (example A1), an integral fastening system for a mission-adaptable aerial vehicle includes a first airframe section having a first end region and a second end region on an opposing side with respect to the first end region; a second airframe section having a first end region and a second end region on an opposing side with respect to the first end region; and a bayonet mount system, which includes one or more passageways produced on the first end region of the first airframe section to include a first channel and second channel, and one or more protrusions produced on the second end region of the second airframe section configured to be connected to the first end region of the first airframe section, such that, when the first and second airframe sections are being assembled, the one or more protrusions are first aligned with an entry region of the first channel to be translated and then aligned with the second channel of the one or more passageways to be rotated to securely connect the first and second airframe sections together.

Example A2 includes the integral fastening system of any of examples A1-A10, wherein the bayonet mount system further includes a locking assembly that includes one or more deflection tabs disposed at one or both of the first end region of the first airframe section and the second end region of the second airframe; and a corresponding slot disposed at one or both of the second end region of the second airframe section and the first end region of the first airframe section, wherein the one or more deflection tabs is configured to deflect radially when depressed by a contact surface of the one or both of the second end region of the second airframe section and the first end region of the first airframe section when the one or more protrusions is translated and rotated within the first channel and the second channel, respectively, of the one or more passageways of the first end region of the first airframe section, such that when the one or more deflection tabs is aligned with the corresponding one or more slots, the one or more deflection tabs is returned to an initial projection state to project into the corresponding one or more slots, thereby locking the first airframe section and second airframe section together.

Example A3 includes the integral fastening system of example A2 or any of examples A1-A10, wherein the one or more deflection tabs is structured to have a ramp angle protrusion height, a tab thickness, and a tab width and structured to include material properties including modulus of elasticity, elongation at break, and flexural modulus to render a ramp protrusion portion of the deflection tab as depressible when undergoing a contact force and returnable to its initial position when the contact force is removed.

Example A4 includes the integral fastening system of example A3 or any of examples A1-A10, wherein the tab thickness of a wall of the deflection tab is at least 1 mm or is in a range of 1 mm to 25 mm.

Example A5 includes the integral fastening system of example A3 or any of examples A1-A10, wherein the tab width of the deflection tab is in a range of 5 mm to 50 mm.

Example A6 includes the integral fastening system of example A3 or any of examples A1-A10, wherein the ramp angle of the deflection tab is in a range of between 5° to 60°.

Example A7 includes the integral fastening system of any of examples A1-A10, wherein one or more protrusions and the one or more passageways are integrally produced through an additive manufacturing technique as part of the first airframe section and second airframe section, thereby facilitating toolless connection and securement of the first airframe section and second airframe section.

Example A8 includes the integral fastening system of any of examples A1-A10, wherein the one or more protrusions includes at least one of a lug, a pin, a nub, or other projection component.

Example A9 includes the integral fastening system of any of examples A1-A10, wherein the one or more passageways includes an open volume in a wall structure of an airframe structure that forms a slot, a channel, or other cavity.

Example A10 includes the integral fastening system of any of examples A1-A9, wherein the first and second airframe sections are configured to be tightly and securely connected based on physical and material properties of structures comprising the one or more protrusions and the one or more passageways through at least one of tight tolerances, fillets, smooth surfaces, or surface draft angles.

In some embodiments in accordance with the present technology (example A11), a mission-adaptable aerial vehicle includes a fuselage assembly, wherein the fuselage assembly comprises one or more fuselage sections; a wing assembly reversibly attachable to the fuselage assembly, wherein the wing assembly comprises at least one wing section; a nose cone assembly reversibly attachable to the fuselage assembly, wherein the nose cone assembly comprises at least one nose cone section; and a tail assembly reversibly attachable to the fuselage assembly, wherein the tail assembly comprises at least one tail section, wherein at least one of the fuselage assembly, the wing assembly, the nose cone assembly, or the tail assembly includes a bayonet mount system.

Example A12 includes the mission-adaptable aerial vehicle of any of examples A11-A14, wherein the bayonet mount system comprises one or more passageways produced on the first end region of the first airframe section to include a first channel and second channel, and one or more protrusions produced on the second end region of the second airframe section configured to be connected to the first end region of the first airframe section, such that, when the first and second airframe sections are being assembled, the one or more protrusions are first aligned with an entry region of the first channel to be translated and then aligned with the second channel of the one or more passageways to be rotated to securely connect the first and second airframe sections together.

Example A13 includes the mission-adaptable aerial vehicle of example A12 or any of examples A11-A14, wherein the bayonet mount system includes one or more features of the integral fastening system of any of examples A1-A10.

Example A14 includes the mission-adaptable aerial vehicle of any of examples A11-A13, further including a propulsion unit at least partially contained in at least one of the tail assembly or the fuselage assembly and configured to drive flight of the aerial vehicle; and an electronics unit comprising a wireless transceiver device and a data processing unit in communication with a control unit of or interfaced with the propulsion unit.

In some embodiments in accordance with the present technology (example B1), an integral fastening system for a mission-adaptable aerial vehicle includes a first airframe section having a first end region and a second end region on an opposing side with respect to the first end region; a second airframe section having a first end region and a second end region on an opposing side with respect to the first end region; and a bayonet mount system that comprises one or more passageways produced on the first end region of the first airframe section to include a first channel and second channel, and one or more protrusions produced on the second end region of the second airframe section configured to be connected to the first end region of the first airframe section, such that, when the first and second airframe sections are being assembled, the one or more protrusions are first aligned with an entry region of the first channel to be translated and then aligned with the second channel of the one or more passageways to be rotated to securely connect the first and second airframe sections together.

Example B2 includes the integral fastening system of example B1 or any of examples B1-B10, wherein the bayonet mount system further includes a locking assembly comprising one or more deflection tabs disposed at one or both of the first end region of the first airframe section and the second end region of the second airframe section; and a corresponding slot disposed at one or both of the second end region of the second airframe section and the first end region of the first airframe section, wherein the one or more deflection tabs is configured to deflect radially when depressed by a contact surface of the one or both of the second end region of the second airframe section and the first end region of the first airframe section when the one or more protrusions is translated and rotated within the first channel and the second channel, respectively, such that when the one or more deflection tabs is aligned with the corresponding one or more slots, the one or more deflection tabs is returned to an initial projection state to project into the corresponding one or more slots, thereby locking the first airframe section and the second airframe section together.

Example B3 includes the integral fastening system of example B2 or any of examples B1-B10, wherein the one or more deflection tabs is structured to have a ramp angle protrusion height, a tab thickness, and a tab width and structured to include material properties including modulus of elasticity, elongation at break, and flexural modulus to render a ramp protrusion portion of the one or more deflection tabs as depressible when undergoing a contact force and returnable to its initial position when the contact force is removed.

Example B4 includes the integral fastening system of example B3 or any of examples B1-B10, wherein the tab thickness of a wall of the one or more deflection tabs is at least 1 mm or is in a range of 1 mm to 25 mm.

Example B5 includes the integral fastening system of example B3 or any of examples B1-B10, wherein the tab width of the one or more deflection tabs is in a range of 5 mm to 50 mm.

Example B6 includes the integral fastening system of example B3 or any of examples B1-B10, wherein a ramp angle of the one or more deflection tabs is in a range of between 5° to 60°.

Example B7 includes the integral fastening system of example B1 or any of examples B1-B10, wherein the one or more protrusions and the one or more passageways are integrally produced through an additive manufacturing technique as part of the first airframe section and the second airframe section, thereby facilitating toolless connection and securement of the first airframe section and the second airframe section.

Example B8 includes the integral fastening system of example B1 or any of examples B1-B10, wherein the one or more protrusions includes at least one of a lug, a pin, a nub, or other projection component.

Example B9 includes the integral fastening system of example B1 or any of examples B1-B10, wherein the one or more passageways includes an open volume in a wall structure of an airframe structure that forms a slot, a channel, or other cavity.

Example B10 includes the integral fastening system of example B1 or any of examples B1-B9, wherein the first and second airframe sections are configured to be tightly and securely connected based on physical and material properties of structures comprising the one or more protrusions and the one or more passageways through at least one of tight tolerances, fillets, smooth surfaces, or surface draft angles.

In some embodiments in accordance with the present technology (example B11) a mission-adaptable aerial vehicle includes a fuselage assembly, wherein the fuselage assembly comprises one or more fuselage sections; a wing assembly reversibly attachable to the fuselage assembly, wherein the wing assembly comprises at least one wing section; a nose cone assembly reversibly attachable to the fuselage assembly, wherein the nose cone assembly comprises at least one nose cone section; and a tail assembly reversibly attachable to the fuselage assembly, wherein the tail assembly comprises at least one tail section, wherein at least one of the fuselage assembly, the wing assembly, the nose cone assembly, or the tail assembly includes a bayonet mount system.

Example B12 includes the mission-adaptable aerial vehicle of example B11 or any of examples B11-B21, wherein the bayonet mount system comprises one or more passageways produced on a first end region of a first airframe section to include a first channel and second channel, and one or more protrusions produced on a second end region of a second airframe section configured to be connected to the first end region of the first airframe section, such that, when the first and second airframe sections are being assembled, the one or more protrusions are first aligned with an entry region of the first channel to be translated and then aligned with the second channel of the one or more passageways to be rotated to securely connect the first and second airframe sections together.

Example B13 includes the mission-adaptable aerial vehicle of example B12 or any of examples B11-B21, wherein the bayonet mount system further includes a locking assembly comprising one or more deflection tabs disposed at one or both of the first end region of the first airframe section and the second end region of the second airframe section; and a one or more slots disposed at one or both of the second end region of the second airframe section and the first end region of the first airframe section, wherein the one or more deflection tabs is configured to deflect radially when depressed by a contact surface of the one or both of the second end region of the second airframe section and the first end region of the first airframe section when the one or more protrusions is translated and rotated within the first channel and the second channel, respectively, such that when the one or more deflection tabs is aligned with corresponding one or more slots, the one or more deflection tabs is returned to an initial projection state to project into the corresponding one or more slots, thereby locking the first airframe section and the second airframe section together.

Example B14 includes the mission-adaptable aerial vehicle of example B13 or any of examples B11-B21, wherein the one or more deflection tabs is structured to have a ramp angle protrusion height, a tab thickness, and a tab width and structured to include material properties including modulus of elasticity, elongation at break, and flexural modulus to render a ramp protrusion portion of the one or more deflection tabs as depressible when undergoing a contact force and returnable to its initial position when the contact force is removed.

Example B15 includes the mission-adaptable aerial vehicle of example B14 or any of examples B11-B21, wherein the tab thickness of a wall of the one or more deflection tabs is at least 1 mm or is in a range of 1 mm to 25 mm.

Example B16 includes the mission-adaptable aerial vehicle of example B14 or any of examples B11-B21, wherein the tab width of the one or more deflection tabs is in a range of 5 mm to 50 mm.

Example B17 includes the mission-adaptable aerial vehicle of example B14 or any of examples B11-B21, wherein a ramp angle of the one or more deflection tabs is in a range of between 5° to 60°.

Example B18 includes the mission-adaptable aerial vehicle of example B12 or any of examples B11-B21, wherein the one or more protrusions and the one or more passageways are integrally produced through an additive manufacturing technique as part of the first airframe section and the second airframe section, thereby facilitating toolless connection and securement of the first airframe section and the second airframe section.

Example B19 includes the mission-adaptable aerial vehicle of example B12 or any of examples B11-B21, wherein the one or more protrusions includes at least one of a lug, a pin, a nub, or other projection component.

Example B20 includes the mission-adaptable aerial vehicle of example B12 or any of examples B11-B21, wherein the one or more passageways includes an open volume in a wall structure of an airframe structure that forms a slot, a channel, or other cavity.

Example B21 includes the mission-adaptable aerial vehicle of example B11 or any of examples B11-B20, further comprising a propulsion unit at least partially contained in at least one of the tail assembly or the fuselage assembly and configured to drive flight of the aerial vehicle; and an electronics unit comprising a wireless transceiver device and a data processing unit in communication with a control unit of or interfaced with the propulsion unit.

In some embodiments in accordance with the present technology (example B22), a method of manufacturing interconnecting airframe structures for a mission-adaptable aerial vehicle includes additively manufacturing a first airframe section to include one or more passageways on the first airframe section, wherein the one or more passageways comprises a first channel and second channel; and additively manufacturing a second airframe section to include one or more protrusions on the second airframe section, wherein the one or more protrusions are able to initially be aligned with an entry region of the first channel and translated into the first channel, and then be aligned with the second channel and rotated in the second channel, so as to securely connect the first airframe section and the second airframe section together, wherein the first airframe section and the second airframe section each includes one section of a fuselage assembly, a wing assembly, a nose cone assembly, or a tail assembly of an aerial vehicle.

Example B23 includes the method of example B22 or any of examples B22-B32, wherein the additively manufacturing the first airframe section and the second airframe section includes 3D-printing the first airframe section and the second airframe section.

Example B24 includes the method of example B22 or any of examples B22-B32, wherein the additively manufacturing the first airframe section and the second airframe section includes injection molding the first airframe section and the second airframe section.

Example B25 includes the method of example B22 or any of examples B22-B32, wherein the one or more passageways is additively manufactured on an end region of the first airframe section.

Example B26 includes the method of example B22 or example B25 or any of examples B22-B32, wherein the one or more protrusions is additively manufactured on an end region of the second airframe section.

Example B27 includes the method of example B22 or any of examples B22-B32, wherein the additively manufacturing the first airframe section and the second airframe section includes additively manufacturing a locking assembly on the first airframe section and the second airframe section, wherein the locking assembly comprises one or more deflection tabs disposed on the first airframe section; and one or more slots disposed on the second airframe section, wherein the one or more deflection tabs is configured to deflect radially when depressed by a contact surface of the second airframe section when the one or more protrusions is being translated and rotated within the first channel and the second channel, respectively, such that when the one or more deflection tabs is aligned with corresponding one or more slots, the one or more deflection tabs is returned to an initial projection state to project into the corresponding one or more slots, thereby locking the first airframe section and the second airframe section together.

Example B28 includes the method of example B22 or any of examples B22-B32, wherein the additively manufacturing the first airframe section and the second airframe section includes additively manufacturing a locking assembly on the first airframe section and the second airframe section, wherein the locking assembly comprises one or more slots disposed on the first airframe section; and one or more deflection tabs disposed on the second airframe section, wherein the one or more deflection tabs is configured to deflect radially when depressed by a contact surface of the first airframe section when the one or more protrusions is being translated and rotated within the first channel and the second channel, respectively, such that when the one or more deflection tabs is aligned with corresponding one or more slots, the one or more deflection tabs is returned to an initial projection state to project into the corresponding one or more slots, thereby locking the first airframe section and the second airframe section together.

Example B29 includes the method of example B22 or any of examples B22-B32, wherein the first airframe section includes a first fuselage section, and the second airframe section includes a second fuselage section.

Example B30 includes the method of example B22 or any of examples B22-B32, wherein the first airframe section includes a fuselage section, and the second airframe section includes a tail section.

Example B31 includes the method of example B22 or any of examples B22-B32, wherein the first airframe section includes a fuselage section, and the second airframe section includes a nose cone section.

Example B32 includes the method of example B22 or any of examples B22-B31, wherein the first airframe section includes a fuselage section, and the second airframe section includes a wing section.

CONCLUSION

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An integral fastening system for a mission-adaptable aerial vehicle, comprising:
    a first airframe section having a first end region and a second end region on an opposing side with respect to the first end region;
    a second airframe section having a first end region and a second end region on an opposing side with respect to the first end region; and
    a bayonet mount system, comprising:
        one or more passageways produced on the first end region of the first airframe section to include a first channel and second channel, and
        one or more protrusions produced on the second end region of the second airframe section configured to be connected to the first end region of the first airframe section, such that, when the first and second airframe sections are being assembled, the one or more protrusions are first aligned with an entry region of the first channel to be translated and then aligned with the second channel of the one or more passageways to be rotated to securely connect the first and second airframe sections together,
    wherein the bayonet mount system further includes a locking assembly comprising:
    one or more deflection tabs disposed at one or both of the first end region of the first airframe section and the second end region of the second airframe section; and
    a corresponding slot disposed at one or both of the second end region of the second airframe section and the first end region of the first airframe section,
    wherein the one or more deflection tabs is configured to deflect radially when depressed by a contact surface of the one or both of the second end region of the second airframe section and the first end region of the first airframe section when the one or more protrusions is translated and rotated within the first channel and the second channel, respectively, such that when the one or more deflection tabs is aligned with the corresponding one or more slots, the one or more deflection tabs is returned to an initial projection state to project into the corresponding one or more slots, thereby locking the first airframe section and the second airframe section together.

2. The integral fastening system of claim 1, wherein the one or more deflection tabs is structured to have a ramp angle protrusion height, a tab thickness, and a tab width and structured to include material properties including modulus of elasticity, elongation at break, and flexural modulus to render a ramp protrusion portion of the one or more deflection tabs as depressible when undergoing a contact force and returnable to its initial position when the contact force is removed.

3. The integral fastening system of claim 2, wherein the tab thickness of a wall of the one or more deflection tabs is at least 1 mm or is in a range of 1 mm to 25 mm.

4. The integral fastening system of claim 2, wherein the tab width of the one or more deflection tabs is in a range of 5 mm to 50 mm.

5. The integral fastening system of claim 2, wherein a ramp angle of the one or more deflection tabs is in a range of between 5° to 60°.

6. The integral fastening system of claim 1, wherein the one or more protrusions and the one or more passageways are integrally produced through an additive manufacturing technique as part of the first airframe section and the second airframe section, thereby facilitating toolless connection and securement of the first airframe section and the second airframe section.

7. The integral fastening system of claim 1, wherein the one or more protrusions includes at least one of a lug, a pin, a nub, or other projection component.

8. The integral fastening system of claim 1, wherein the one or more passageways includes an open volume in a wall structure of an airframe structure that forms a slot, a channel, or other cavity.

9. The integral fastening system of claim 1, wherein the first and second airframe sections are configured to be tightly and securely connected based on physical and material properties of structures comprising the one or more protrusions and the one or more passageways through at least one of tight tolerances, fillets, smooth surfaces, or surface draft angles.

10. A mission-adaptable aerial vehicle, comprising:
    a fuselage assembly, wherein the fuselage assembly comprises one or more fuselage sections;
    a wing assembly reversibly attachable to the fuselage assembly, wherein the wing assembly comprises at least one wing section;
    a nose cone assembly reversibly attachable to the fuselage assembly, wherein the nose cone assembly comprises at least one nose cone section; and
    a tail assembly reversibly attachable to the fuselage assembly, wherein the tail assembly comprises at least one tail section,
    wherein at least one of the fuselage assembly, the wing assembly, the nose cone assembly, or the tail assembly includes a bayonet mount system,
    wherein the bayonet mount system comprises:
        one or more passageways produced on a first end region of a first airframe section to include a first channel and second channel, and
        one or more protrusions produced on a second end region of a second airframe section configured to be connected to the first end region of the first airframe section, such that, when the first and second airframe sections are being assembled, the one or more protrusions are first aligned with an entry region of the first channel to be translated and then aligned with the second channel of the one or more passageways to be rotated to securely connect the first and second airframe sections together,
    wherein the bayonet mount system further includes a locking assembly comprising:
    one or more deflection tabs disposed at one or both of the first end region of the first airframe section and the second end region of the second airframe section; and a one or more slots disposed at one or both of the second end region of the second airframe section and the first end region of the first airframe section, wherein the one or more deflection tabs is configured to deflect radially when depressed by a contact surface of the one or both of the second end region of the second airframe section and the first end region of the first airframe section when the one or more protrusions is translated and rotated within the first channel and the second channel, respectively, such that when the one or more deflection tabs is aligned with corresponding one or more slots, the one or more deflection tabs is returned to an initial projection state to project into the corresponding one or more slots, thereby locking the first airframe section and the second airframe section together.

11. The mission-adaptable aerial vehicle of claim 10, wherein the one or more deflection tabs is structured to have a ramp angle protrusion height, a tab thickness, and a tab width and structured to include material properties including modulus of elasticity, elongation at break, and flexural modulus to render a ramp protrusion portion of the one or more deflection tabs as depressible when undergoing a contact force and returnable to its initial position when the contact force is removed.

12. The mission-adaptable aerial vehicle of claim 11, wherein:
the tab thickness of a wall of the one or more deflection tabs is at least 1 mm or is in a range of 1 mm to 25 mm, or
the tab width of the one or more deflection tabs is in a range of 5 mm to 50 mm.

13. The mission-adaptable aerial vehicle of claim 11, wherein a ramp angle of the one or more deflection tabs is in a range of between 5° to 60°.

14. The mission-adaptable aerial vehicle of claim 10, wherein the one or more protrusions and the one or more passageways are integrally produced through an additive manufacturing technique as part of the first airframe section and the second airframe section, thereby facilitating toolless connection and securement of the first airframe section and the second airframe section.

15. The mission-adaptable aerial vehicle of claim 10, wherein the one or more protrusions includes at least one of a lug, a pin, a nub, or other projection component.

16. The mission-adaptable aerial vehicle of claim 10, wherein the one or more passageways includes an open volume in a wall structure of an airframe structure that forms a slot, a channel, or other cavity.

17. The mission-adaptable aerial vehicle of claim 10, further comprising:
a propulsion unit at least partially contained in at least one of the tail assembly or the fuselage assembly and configured to drive flight of the aerial vehicle; and
an electronics unit comprising a wireless transceiver device and a data processing unit in communication with a control unit of or interfaced with the propulsion unit.

18. A method of manufacturing interconnecting airframe structures for a mission-adaptable aerial vehicle, comprising:
additively manufacturing a first airframe section to include one or more passageways on the first airframe section, wherein the one or more passageways comprises a first channel and second channel; and
additively manufacturing a second airframe section to include one or more protrusions on the second airframe section, wherein the one or more protrusions are able to initially be aligned with an entry region of the first channel and translated into the first channel, and then be aligned with the second channel and rotated in the second channel, so as to securely connect the first airframe section and the second airframe section together,
wherein the first airframe section and the second airframe section each includes one section of a fuselage assembly, a wing assembly, a nose cone assembly, or a tail assembly of an aerial vehicle,
wherein the additively manufactured first airframe section and the additively manufactured second airframe section includes a locking assembly comprising:
one or more deflection tabs disposed at one or both of a first end region of the first airframe section and a second end region of the second airframe section; and
a corresponding slot disposed at one or both of the second end region of the second airframe section and the first end region of the first airframe section,
wherein the one or more deflection tabs is configured to deflect radially when depressed by a contact surface of the one or both of the second end region of the second airframe section and the first end region of the first airframe section when the one or more protrusions is translated and rotated within the first channel and the second channel, respectively, such that when the one or more deflection tabs is aligned with the corresponding one or more slots, the one or more deflection tabs is returned to an initial projection state to project into the corresponding one or more slots, thereby locking the first airframe section and the second airframe section together.

19. The method of claim 18, wherein the additively manufacturing the first airframe section and the second airframe section includes 3D-printing the first airframe section and the second airframe section.

20. The method of claim 18, wherein the additively manufacturing the first airframe section and the second airframe section includes injection molding the first airframe section and the second airframe section.

* * * * *